United States Patent
Isokawa

(10) Patent No.: US 10,984,820 B2
(45) Date of Patent: Apr. 20, 2021

(54) MAGNETIC DISK DEVICE HAVING MULTIPLE WRITERS WITH WRITING CURRENT OF DIFFERENT FREQUENCIES

(71) Applicants: Kabushiki Kaisha Toshiba, Tokyo (JP); Toshiba Electronic Devices & Storage Corporation, Tokyo (JP)

(72) Inventor: Hiroshi Isokawa, Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 16/796,705

(22) Filed: Feb. 20, 2020

(65) Prior Publication Data
US 2021/0035602 A1 Feb. 4, 2021

(30) Foreign Application Priority Data
Aug. 1, 2019 (JP) ............................. JP2019-142160

(51) Int. Cl.
| | | |
|---|---|---|
| G11B 5/54 | (2006.01) | |
| G11B 5/012 | (2006.01) | |
| G11B 5/09 | (2006.01) | |
| G11B 5/48 | (2006.01) | |
| G11B 5/49 | (2006.01) | |
| G11B 5/02 | (2006.01) | |
| G11B 5/187 | (2006.01) | |

(52) U.S. Cl.
CPC ............... *G11B 5/012* (2013.01); *G11B 5/09* (2013.01); *G11B 5/4886* (2013.01); *G11B 5/02* (2013.01); *G11B 5/1871* (2013.01); *G11B 5/4907* (2013.01); *G11B 5/4915* (2013.01); *G11B 5/4923* (2013.01)

(58) Field of Classification Search
None
See application file for complete search history.

(56) References Cited

U.S. PATENT DOCUMENTS

| | | | |
|---|---|---|---|
| 4,005,482 A | 1/1977 | Castro et al. | |
| 4,786,991 A | 11/1988 | Yamamori | |
| 7,123,435 B1 * | 10/2006 | Schreck | G11B 5/59655 |
| | | | 360/78.08 |
| 2004/0218299 A1 * | 11/2004 | Sato | G11B 5/59633 |
| | | | 360/31 |
| 2018/0301162 A1 * | 10/2018 | Erden | G11B 5/4886 |
| 2020/0227074 A1 * | 7/2020 | Isokawa | G11B 5/09 |

FOREIGN PATENT DOCUMENTS

JP H2-210607 A 8/1990

* cited by examiner

*Primary Examiner* — Tan X Dinh
(74) *Attorney, Agent, or Firm* — White & Case LLP

(57) ABSTRACT

According to one embodiment, a magnetic disk device includes a disk, a head including a first write head and a second write head configured to write data to the disk and a read head configured to read data from the disk, and a controller configured to write write data to a first area of the disk with the first write head and to overwrite the write data written with the first write head in the first area with the second write head.

18 Claims, 30 Drawing Sheets

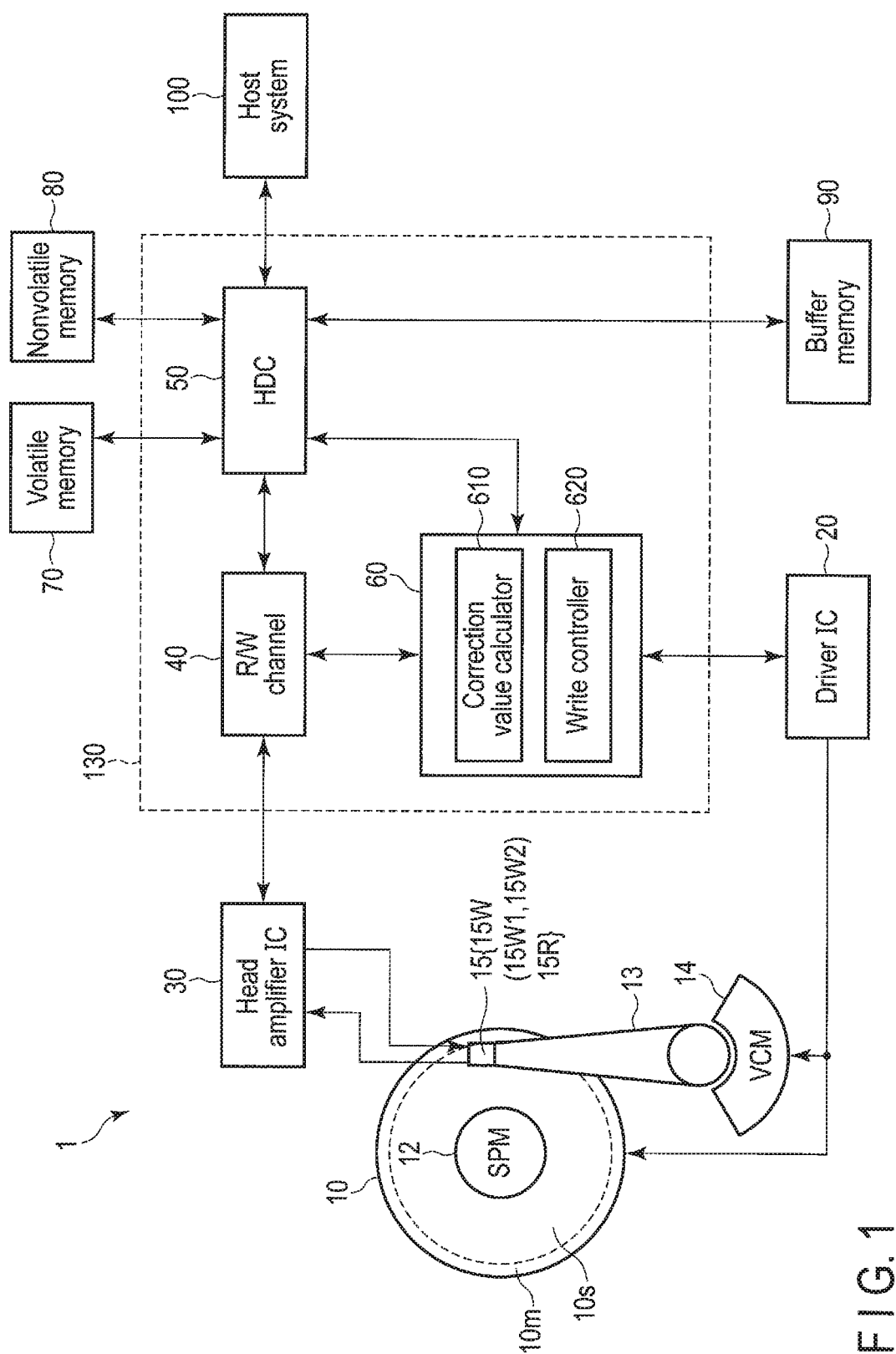
F I G. 1

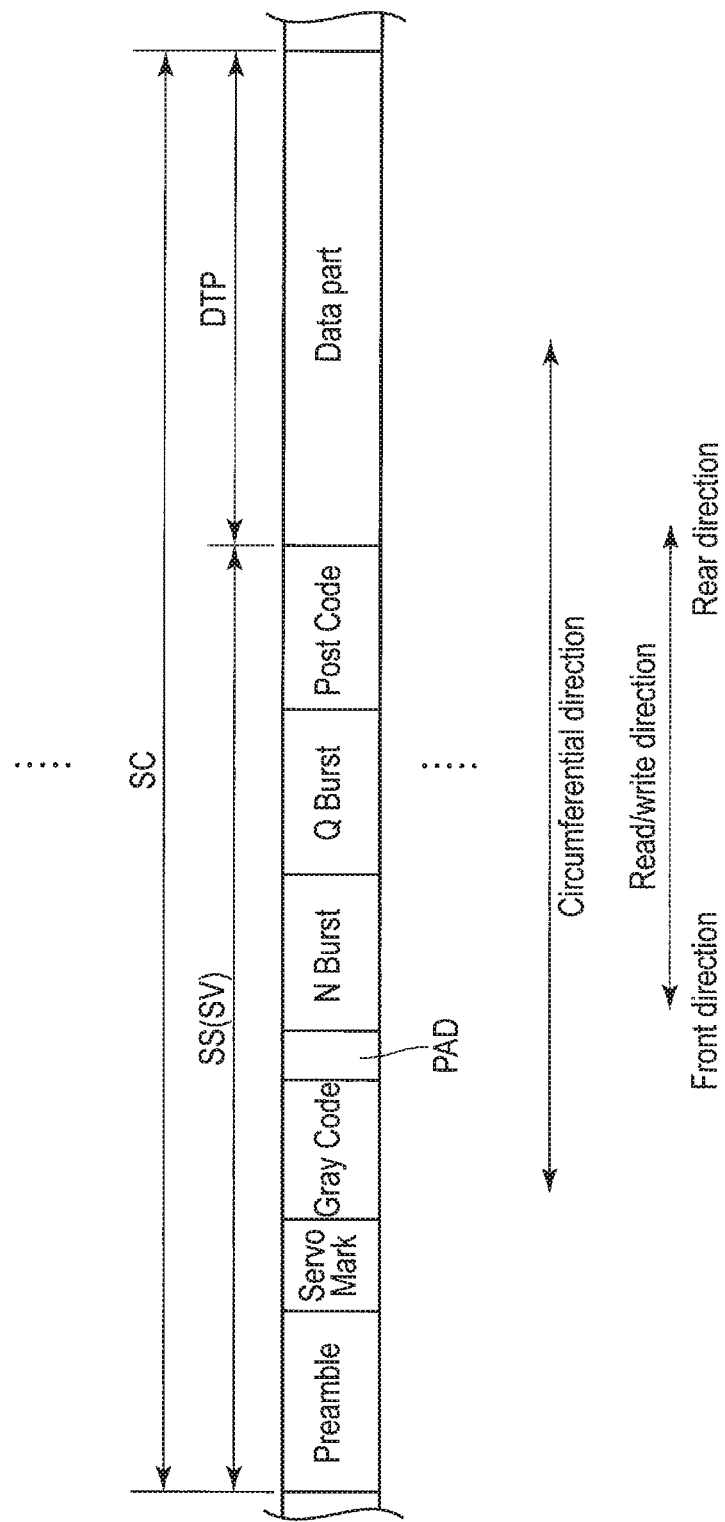
F I G. 3

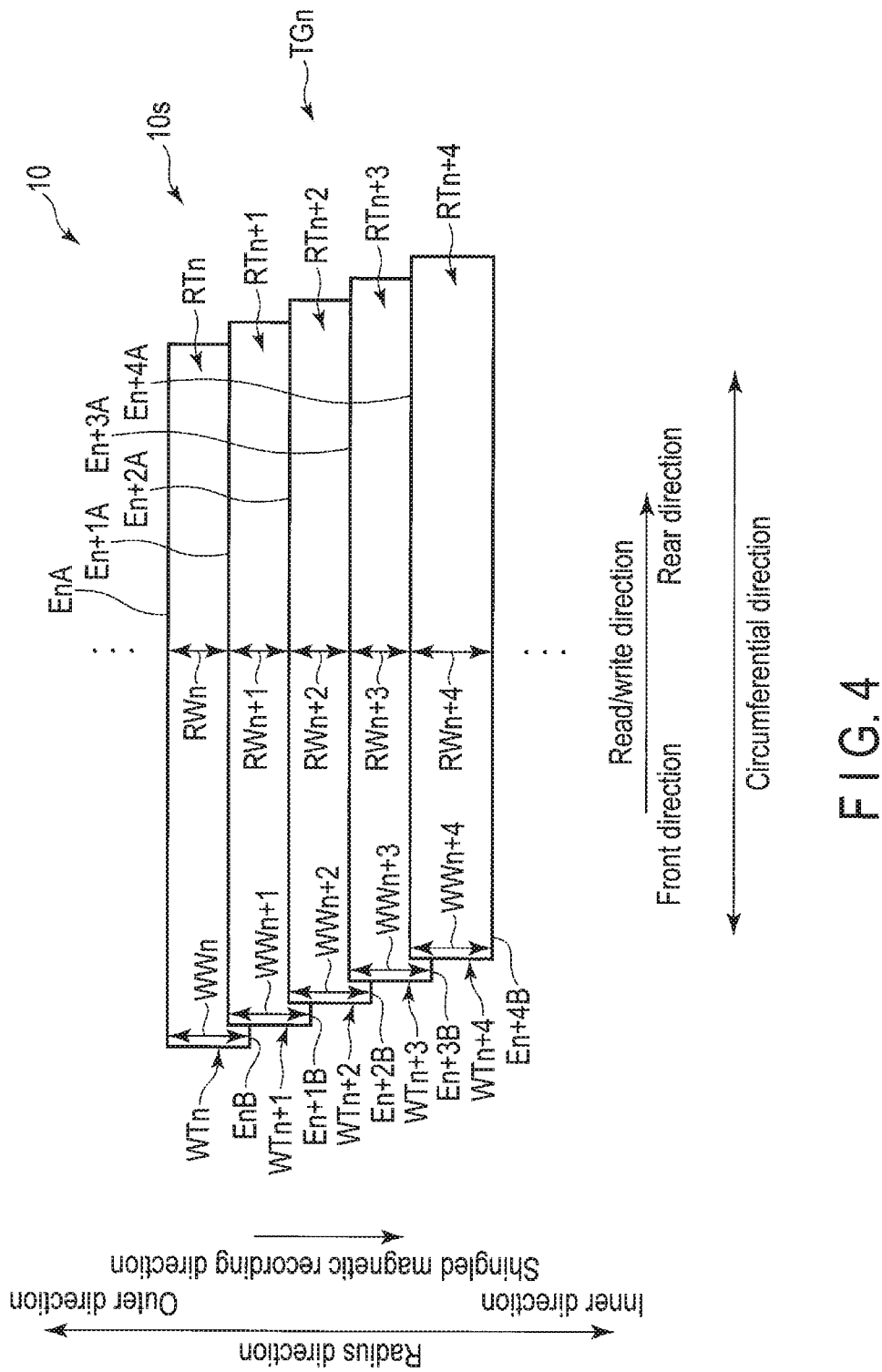
F I G. 4

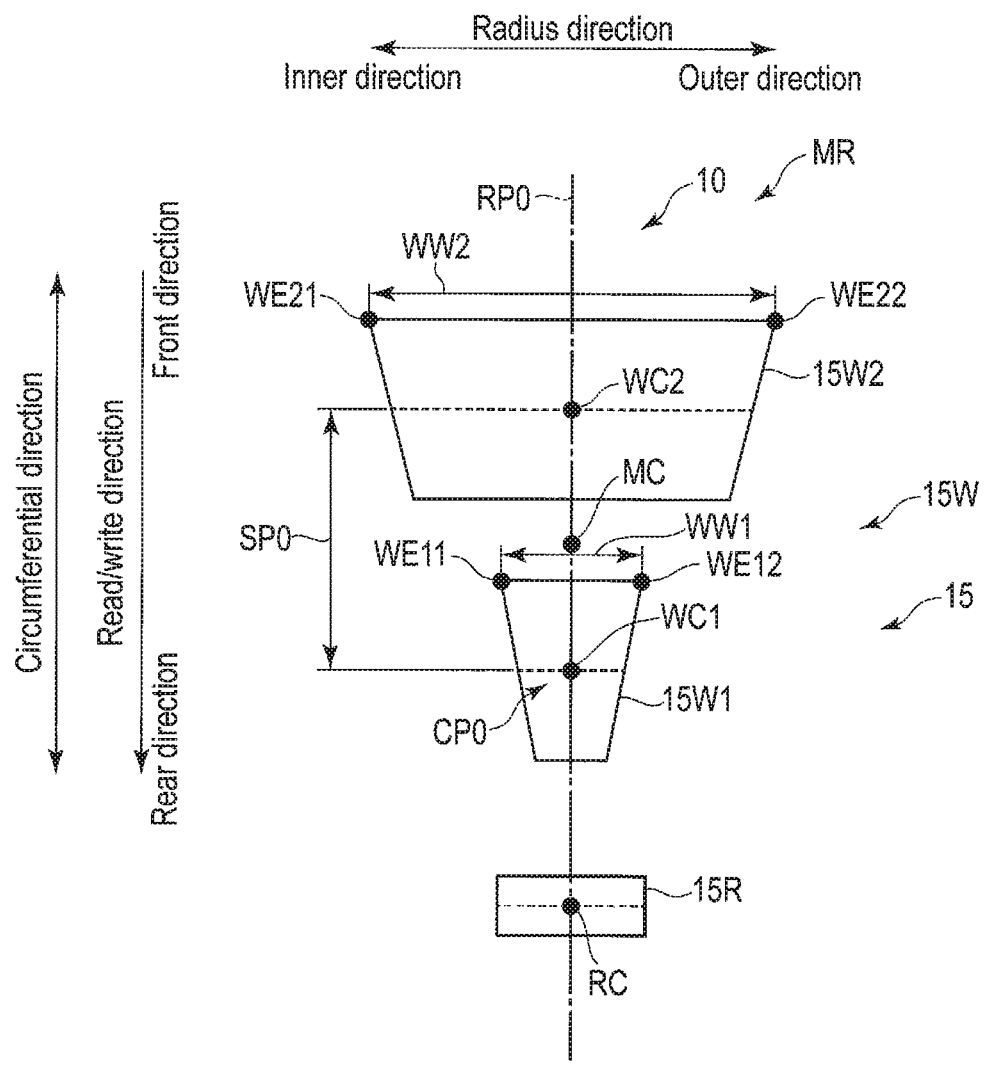
F I G. 5

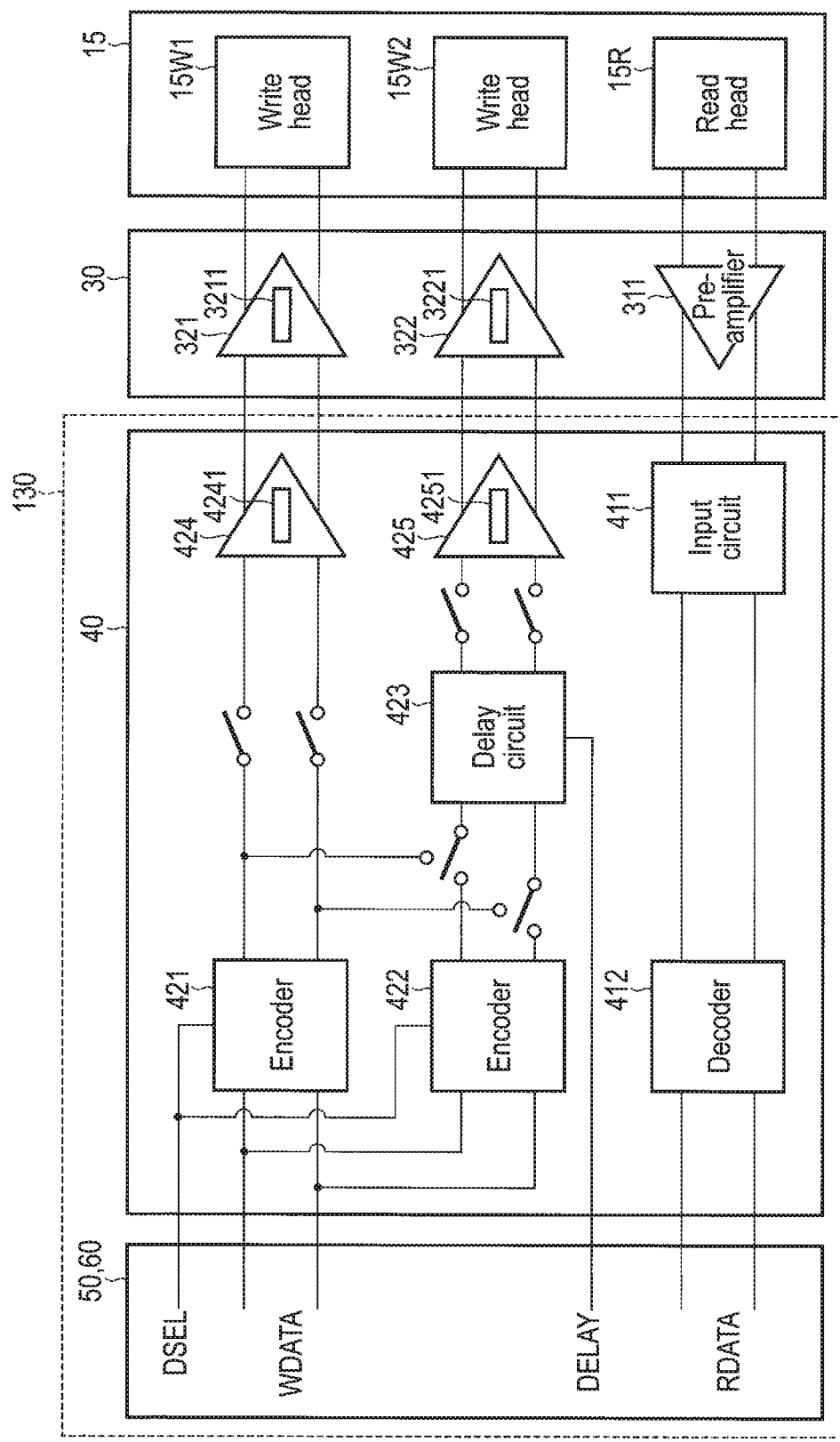
F I G. 7

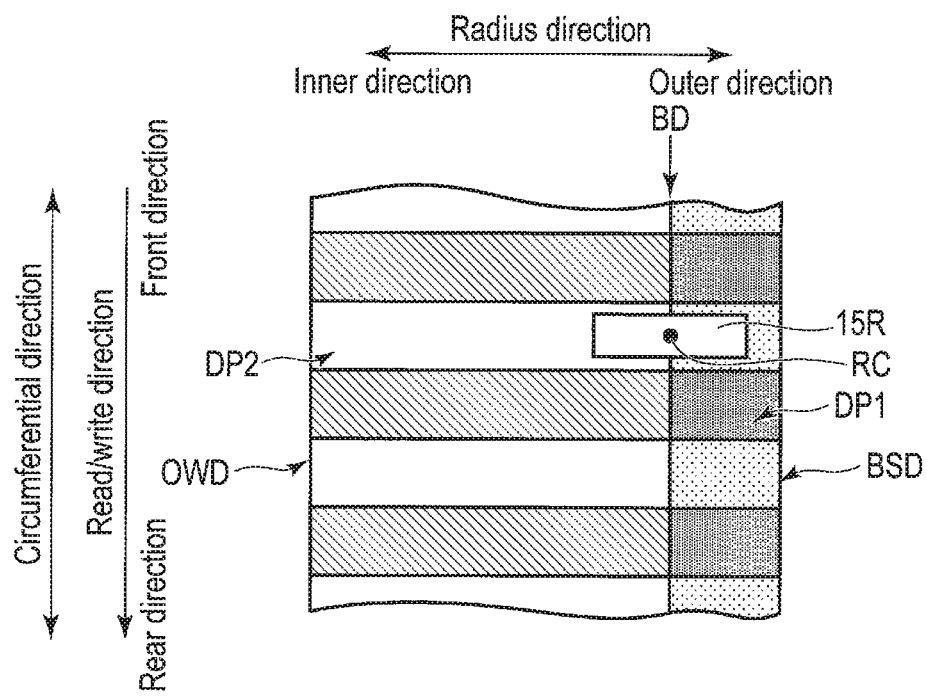
F I G. 13
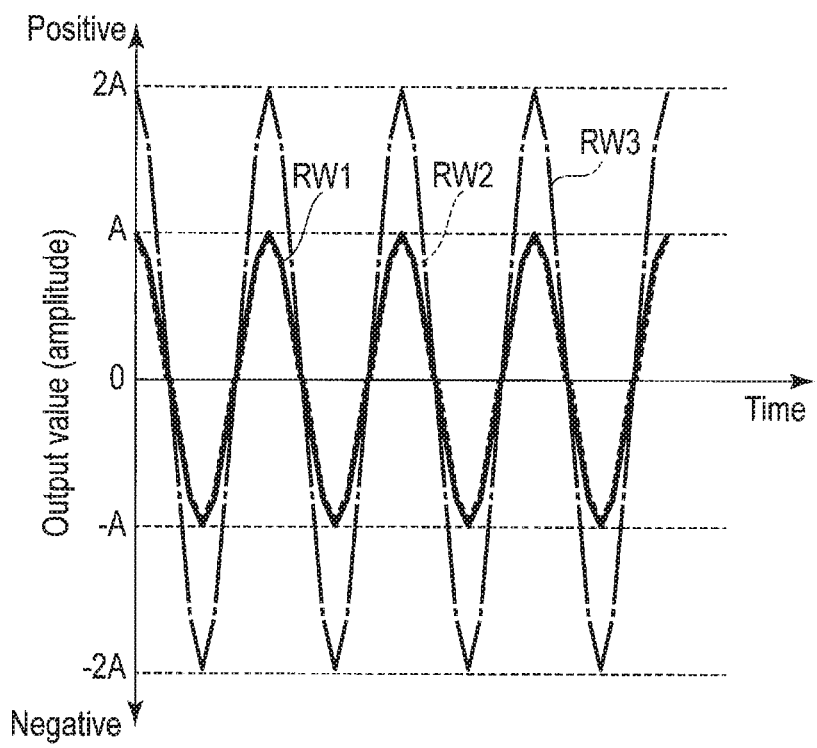
F I G. 14

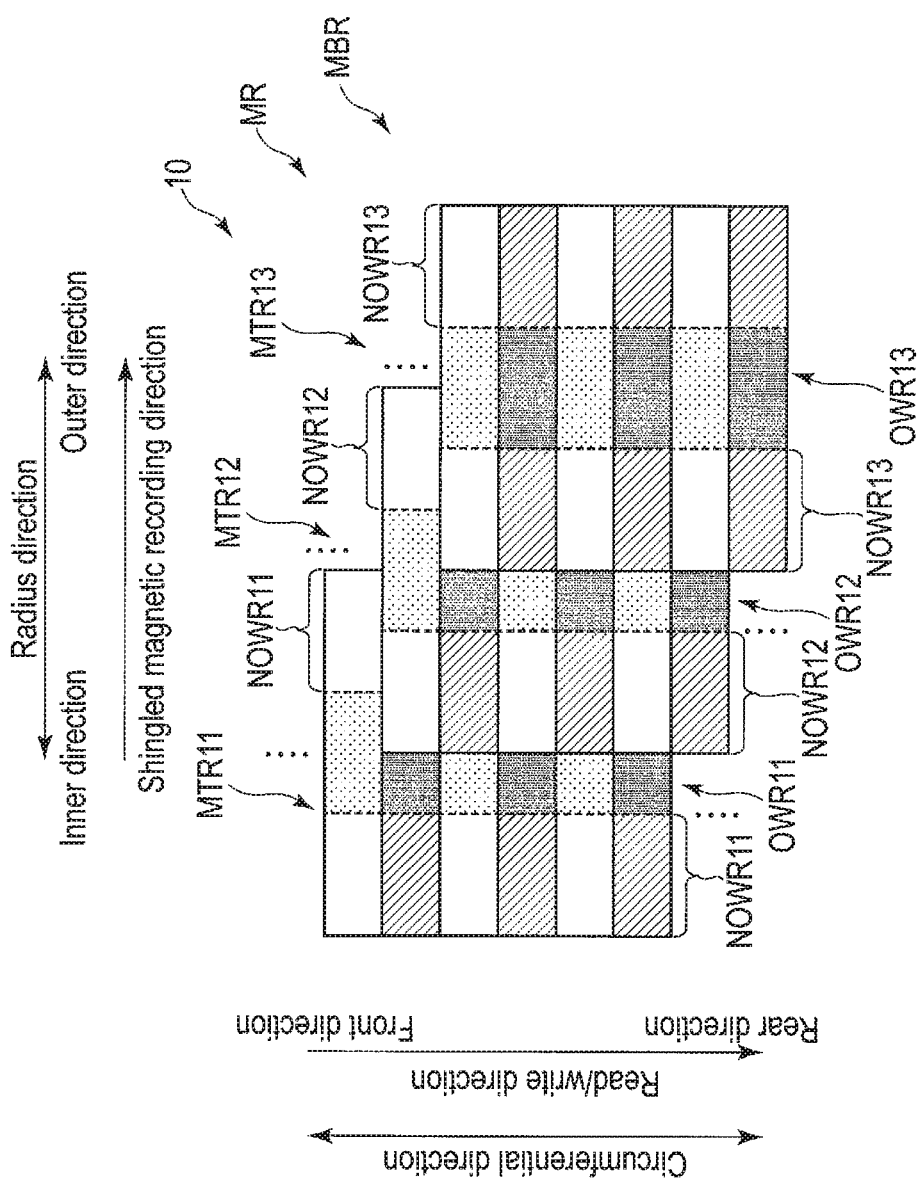
F I G. 16

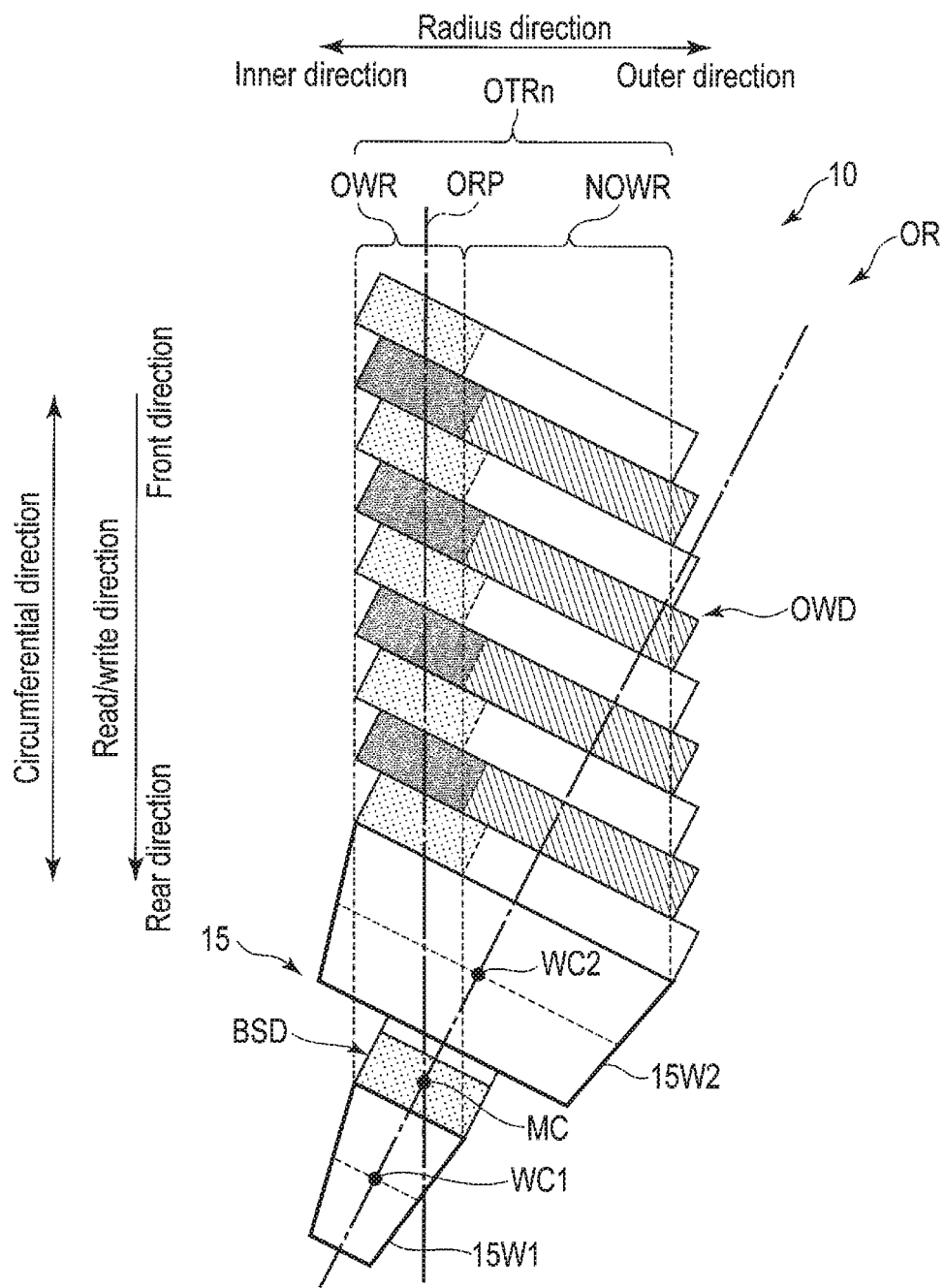
F I G. 17

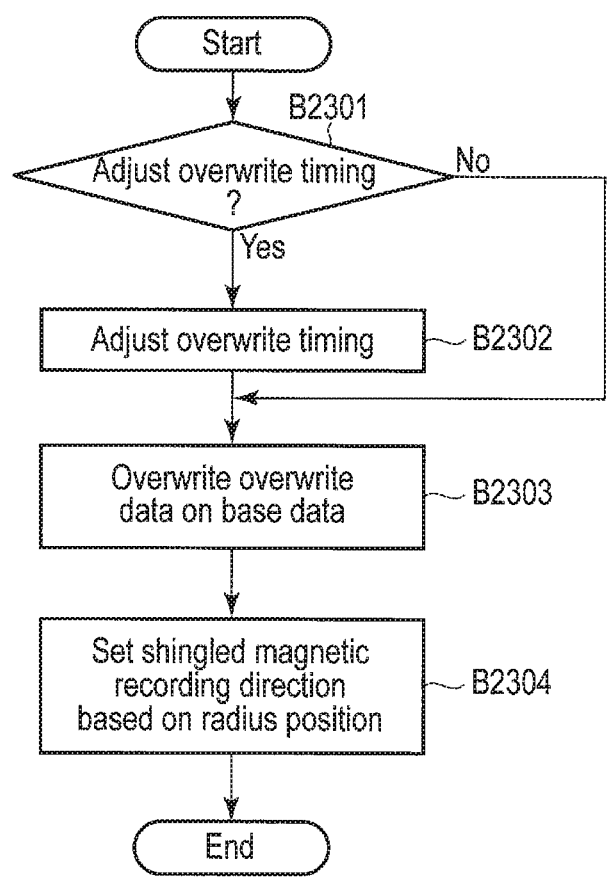
F I G. 23

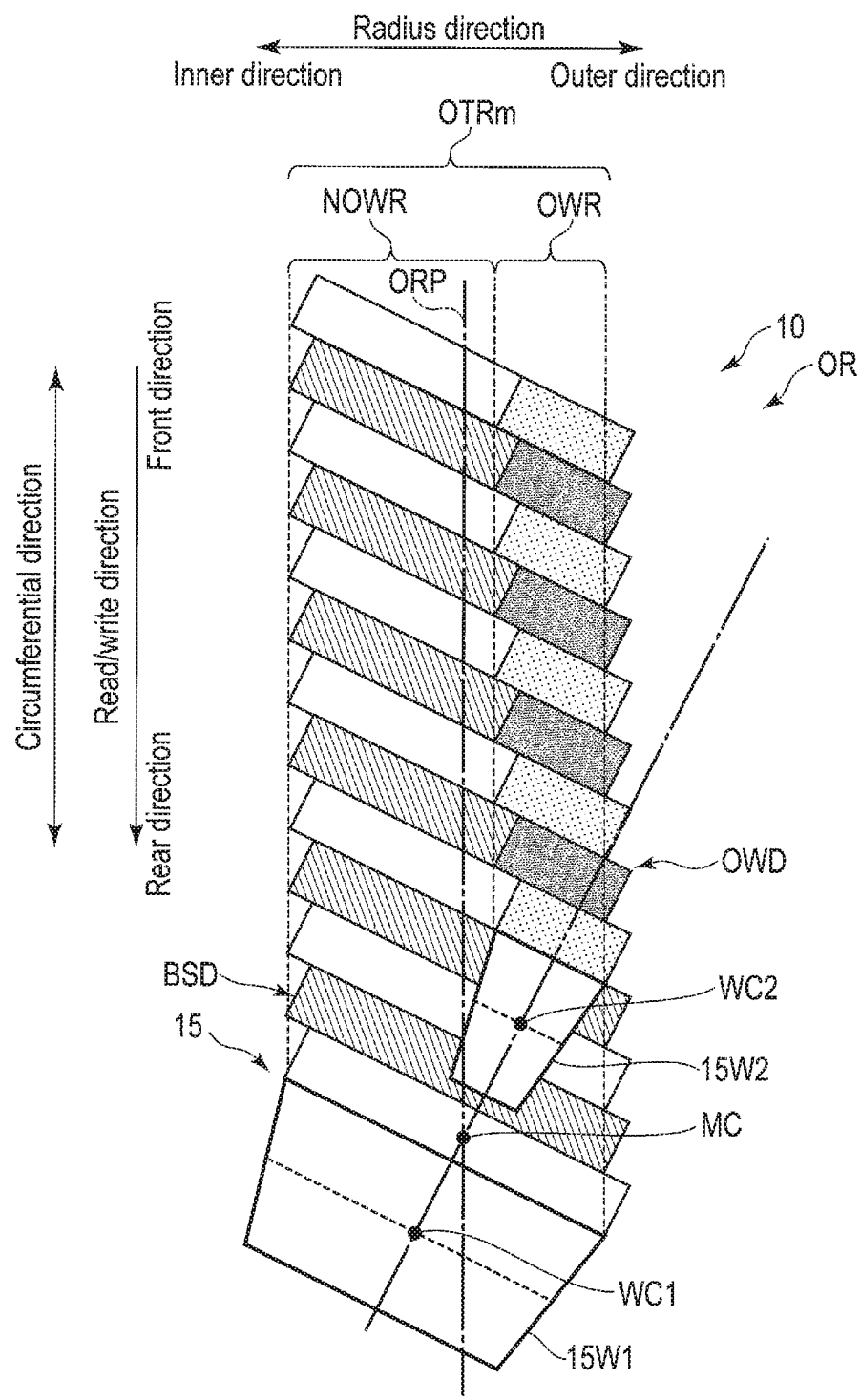
F I G. 26

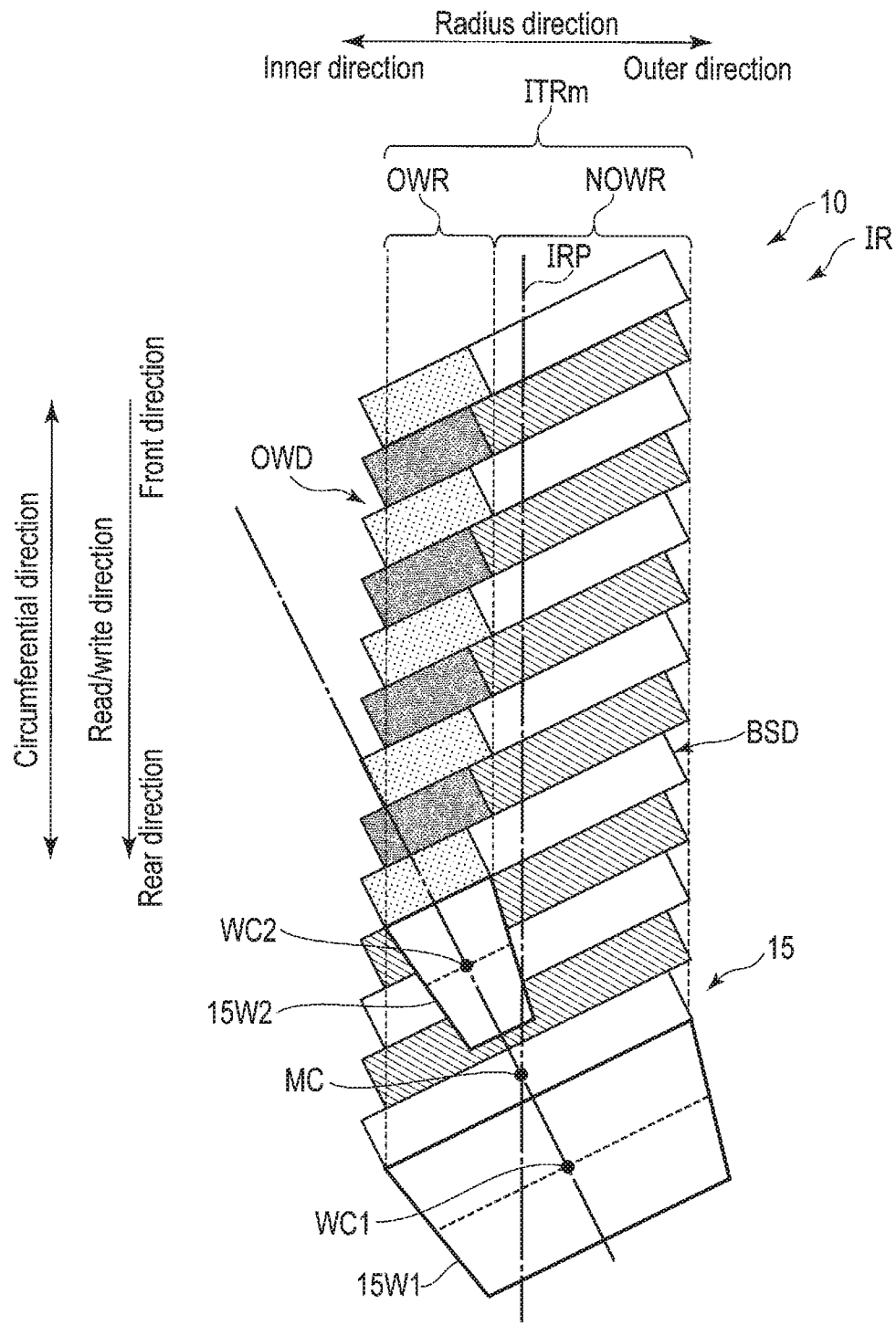
F I G. 28

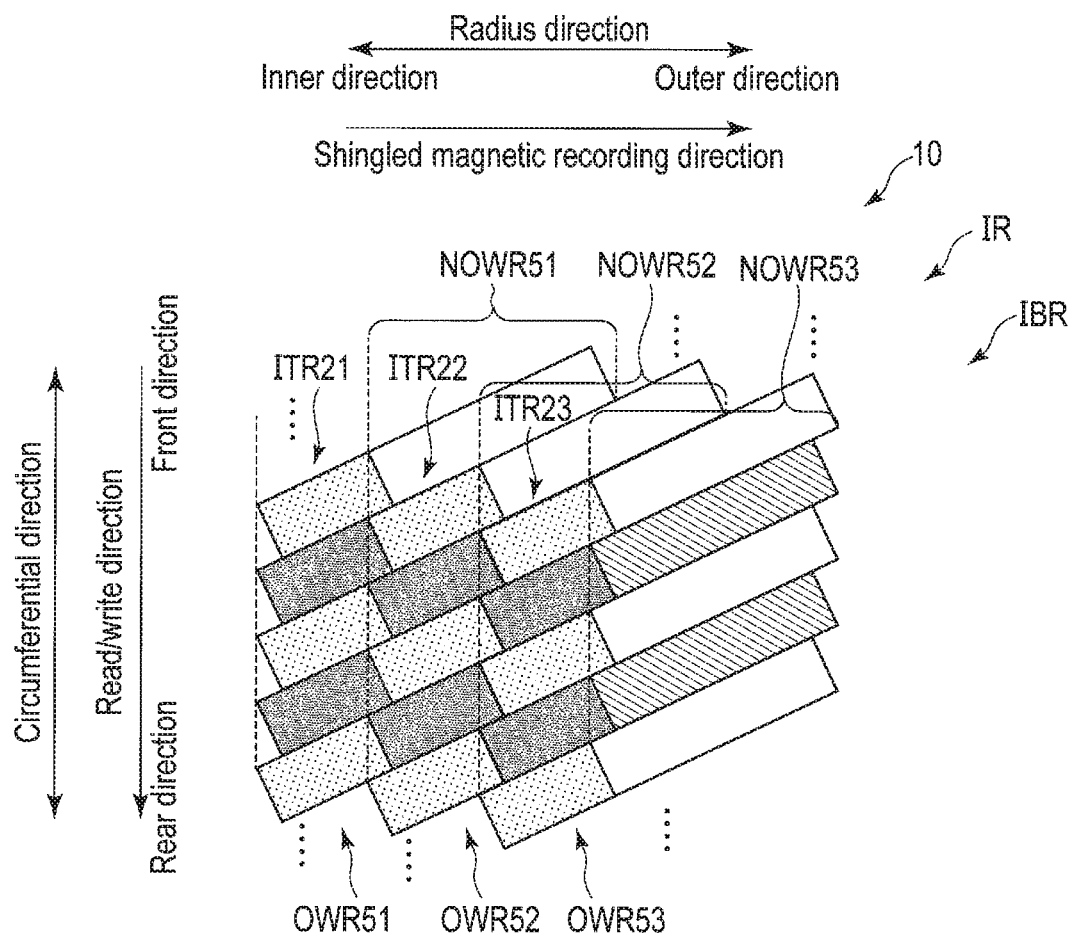
F I G. 29

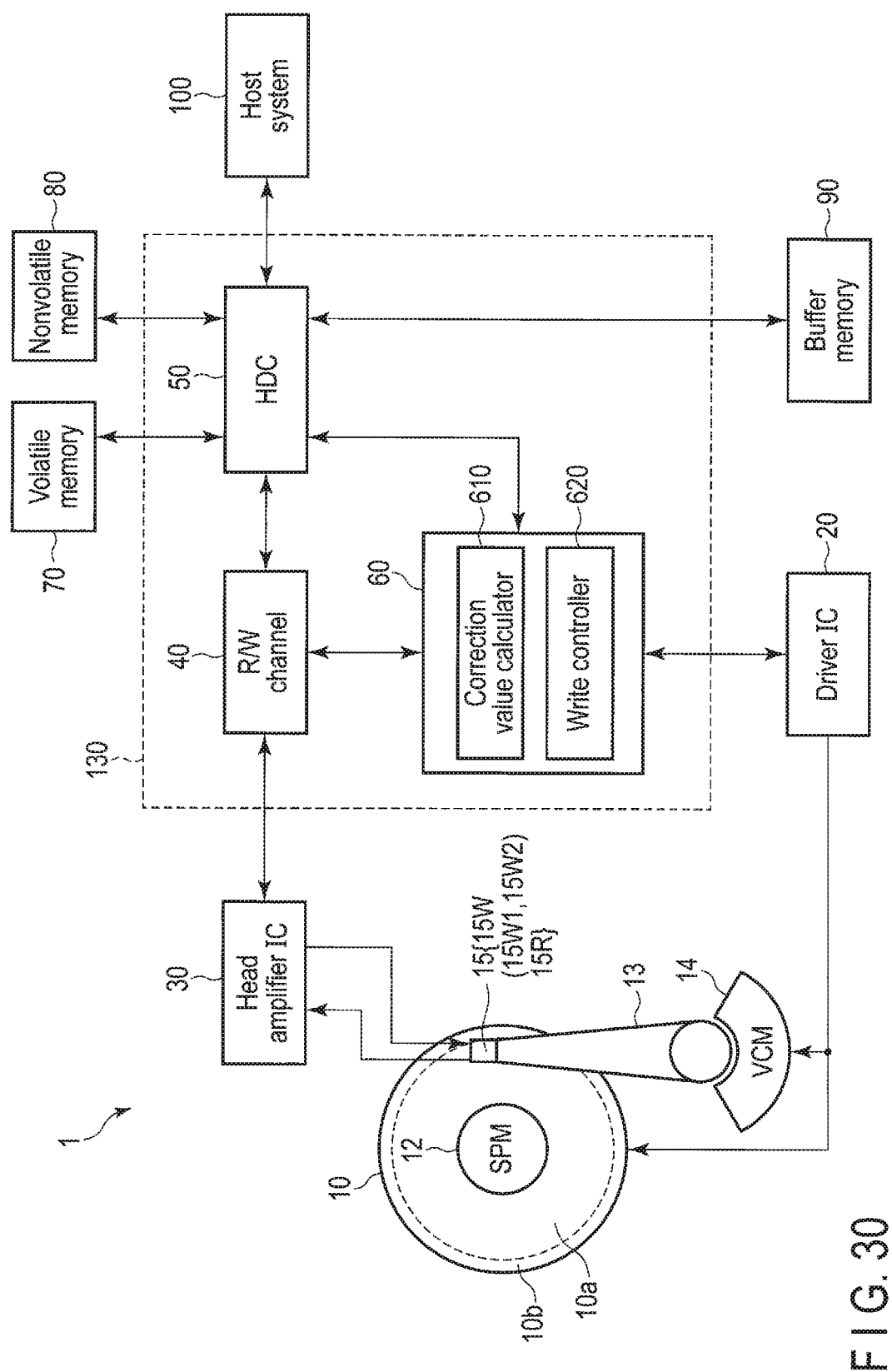
F I G. 30

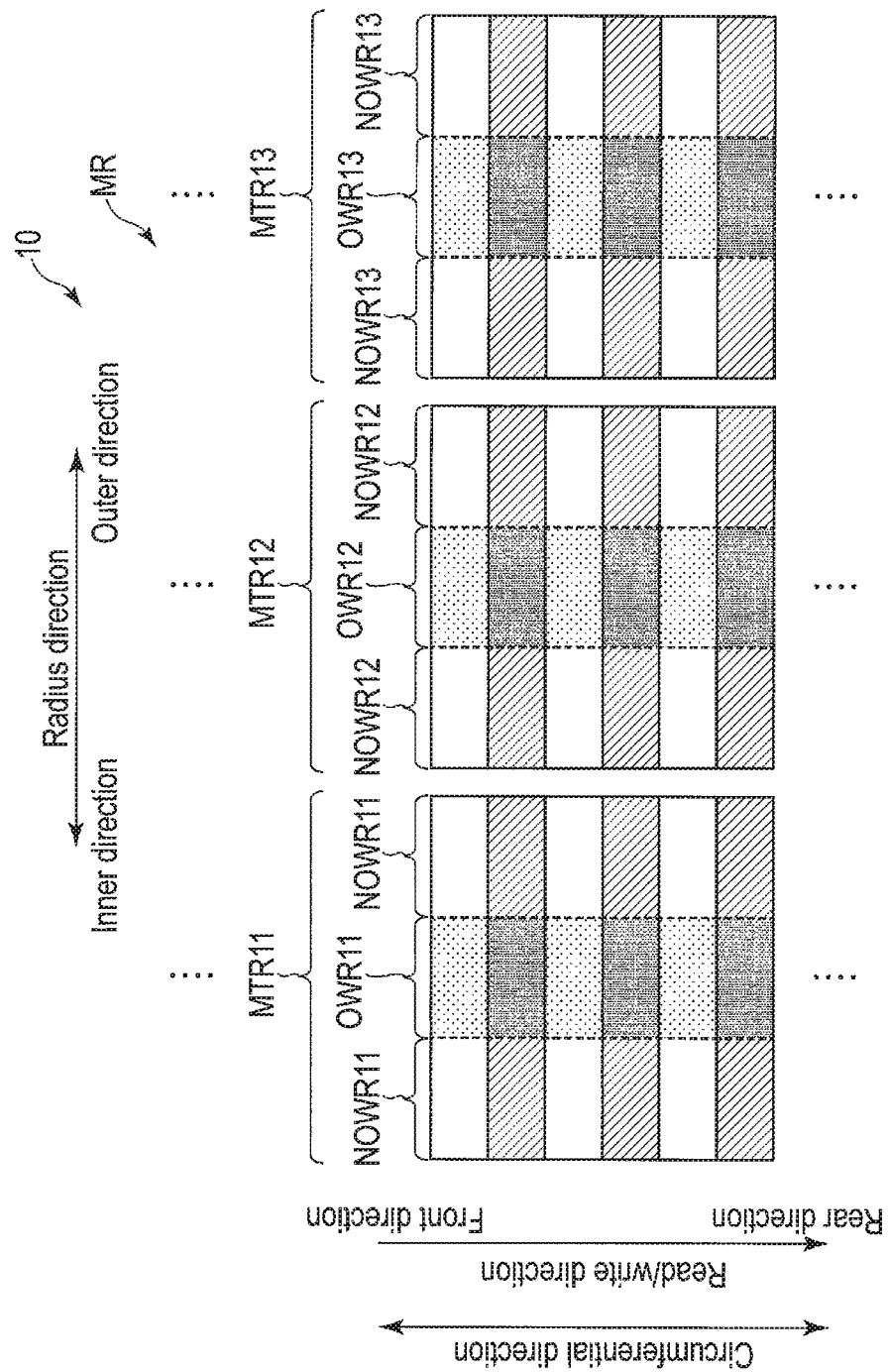
F I G. 31

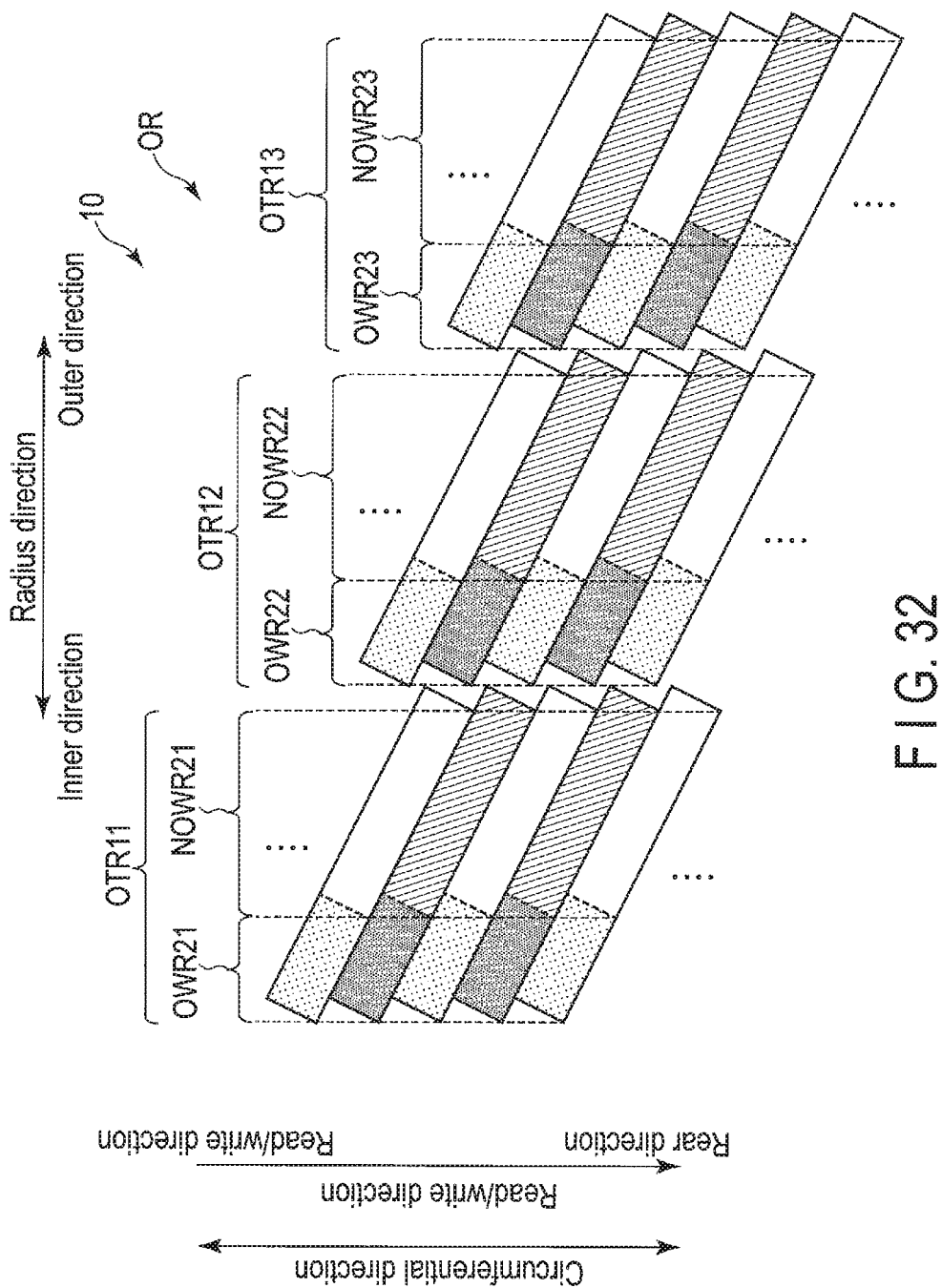
F I G. 32

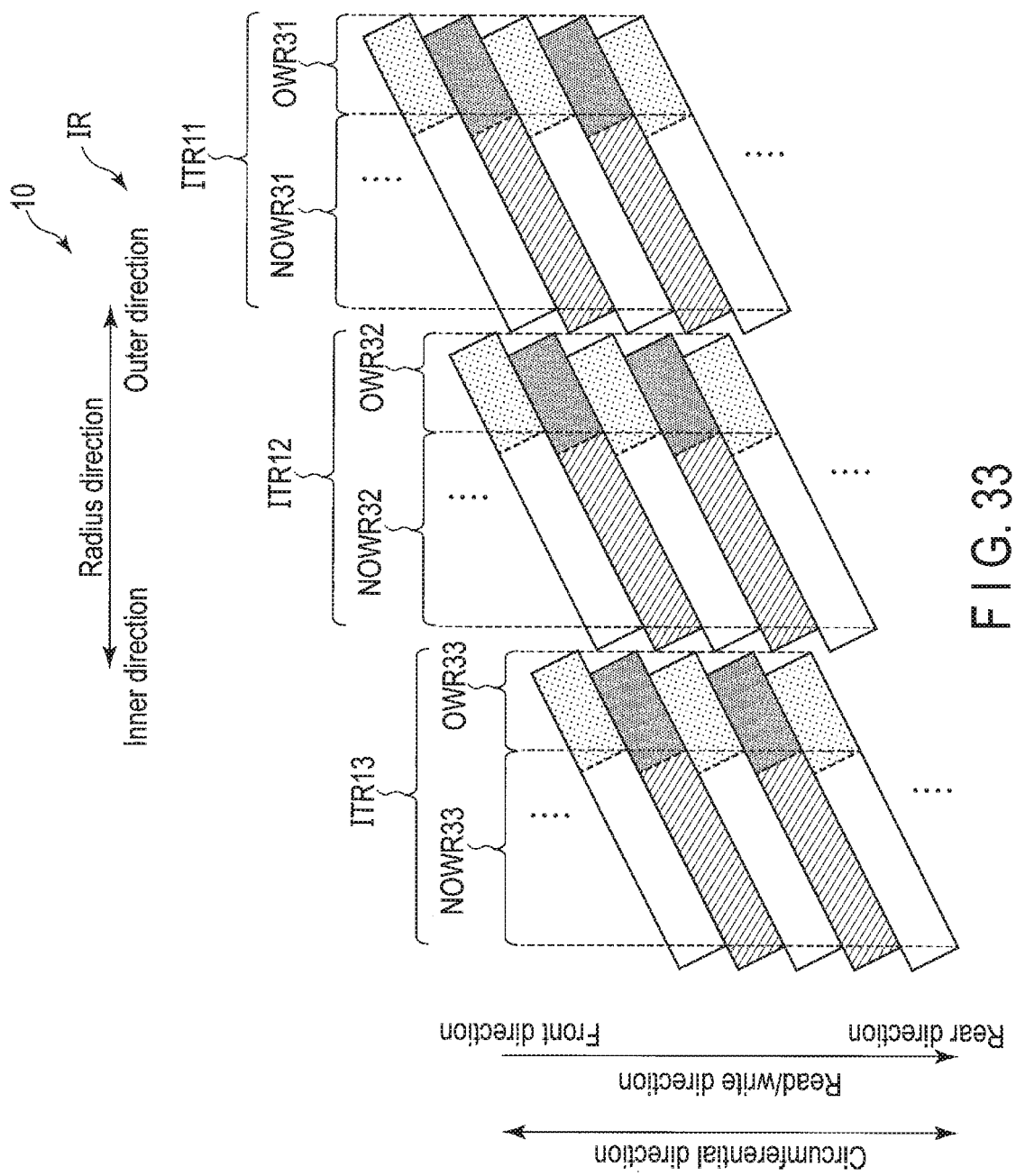
F I G. 33

MAGNETIC DISK DEVICE HAVING MULTIPLE WRITERS WITH WRITING CURRENT OF DIFFERENT FREQUENCIES

CROSS-REFERENCE TO RELATED APPLICATIONS

This application is based upon and claims the benefit of priority from Japanese Patent Application No. 2019-142160, filed Aug. 1, 2019, the entire contents of which are incorporated herein by reference.

FIELD

Embodiments described herein relate generally to a magnetic disk device and a write processing method.

BACKGROUND

In recent years, magnetic disk devices configured to write data to a magnetic disk (disk) in a high recording density manner have been developed. When data are written in a disk in a high recording density manner, tracks have narrower track pitches and thus, recording quality of data may possibly be deteriorated. Therefore, a technique to write data in a disk of the magnetic disk devices in a high recording density manner while keeping the recording quality is desired. For example, there is a technique of repeating writing data with write currents of different frequencies in a certain recording area to improve the recording quality of the data.

BRIEF DESCRIPTION OF THE DRAWINGS

FIG. 1 is a block diagram illustrating the structure of a magnetic disk device 1 of a first embodiment.
FIG. 3 is a schematic diagram illustrating an example of the structure of a sector.
FIG. 4 is a schematic diagram illustrating an example of the shingled magnetic recording area in which data are written.
FIG. 5 is a plan view schematically illustrating an example of geometrical arrangement of two write heads and a read head of the first embodiment.
FIG. 7 is a block diagram illustrating a structural example of a read/write system of the first embodiment.
FIG. 13 is a diagram illustrating an example of a calculation process of an overwrite correction value of the first embodiment.
FIG. 14 is a diagram illustrating an example of a read waveform corresponding to base data written by the write head and a read waveform corresponding to overwrite data written by the write head shown in FIG. 13, and a waveform formed by overlapping the read waveforms.
FIG. 16 is a diagram illustrating an example of a band area written in the middle periphery area.
FIG. 17 is a diagram illustrating an example of an overwrite process in a case where the head is positioned in an outer periphery area.
FIG. 23 is a flowchart of an example of a write processing method of the first embodiment.
FIG. 26 is a diagram illustrating an example of an overwrite process when a head is positioned in an outer periphery area.
FIG. 28 is a diagram illustrating an example of an overwrite process when a head is positioned in an inner periphery area.
FIG. 29 is a diagram illustrating an example of a band area written in an outer periphery area.
FIG. 30 is a block diagram illustrating the structure of a magnetic disk device of variation 2.
FIG. 31 is a diagram illustrating an example of tracks written in a middle periphery area.
FIG. 32 is a diagram illustrating an example of tracks written in an outer periphery area.
FIG. 33 is a diagram illustrating an example of tracks written in an inner periphery area.

DETAILED DESCRIPTION

Figure 2:
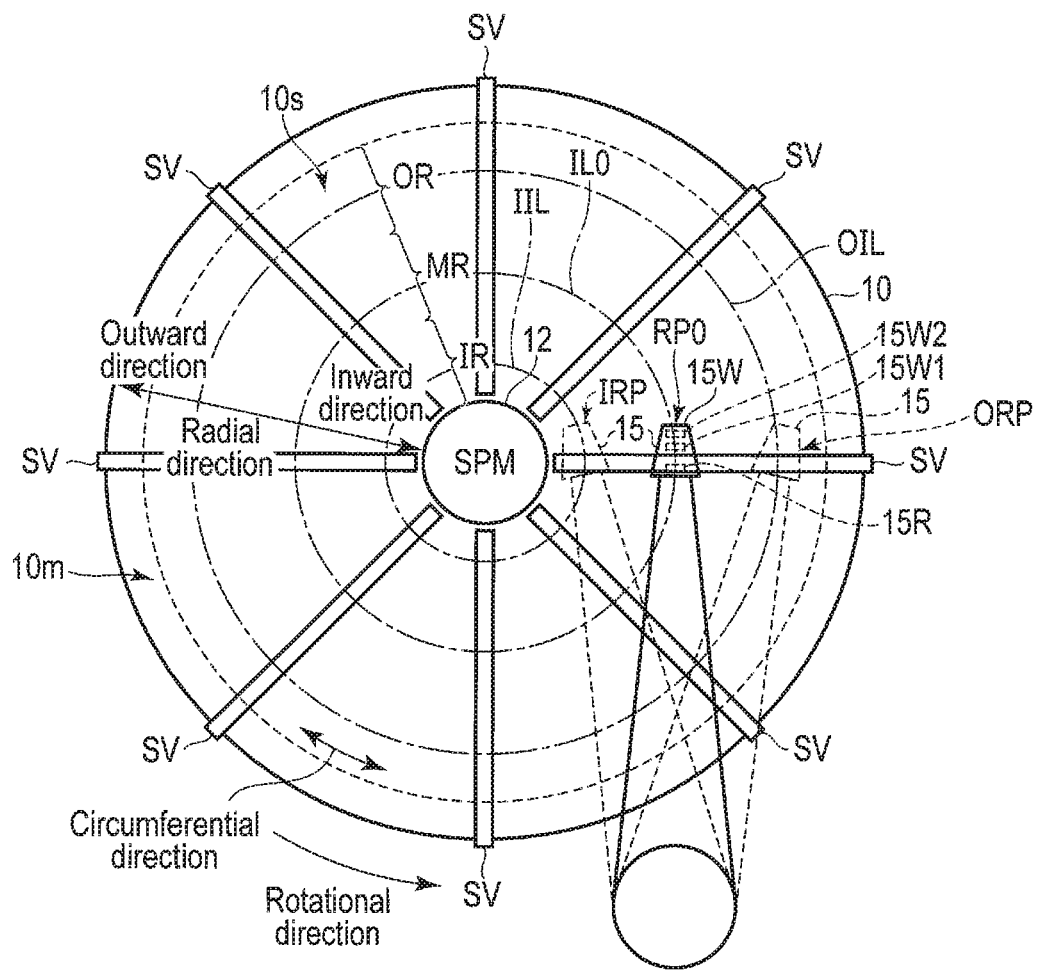
FIG. 2 is a schematic diagram illustrating an example of arrangement of a head with respect to a disk of the first embodiment.

In general, according to one embodiment, a magnetic disk device comprising: a disk; a head including a first write head and a second write head configured to write data to the disk and a read head configured to read data from the disk; and a controller configured to write write data to a first area of the disk with the first write head and to overwrite the write data written with the first write head in the first area with the second write head.

Hereinafter, embodiments will be explained with reference to accompanying drawings. Note that the drawings show examples, and do not limit the scope of the invention.

First Embodiment

FIG. 1 is a block diagram illustrating a magnetic disk device 1 of the first embodiment.

The magnetic disk device 1 includes, as will be described later, a head disk assembly (HDA), driver IC 20, head amplifier integrated circuit (which may be referred to as head amplifier IC or preamplifier) 30, volatile memory 70, nonvolatile memory 80, buffer memory (buffer) 90, and system controller 130 as a one-chip integrated circuit. Furthermore, the magnetic disk device 1 is connected to a host system (host) 100.

The HDA includes a magnetic disk (disk) 10, spindle motor (SPM) 12, arm 13 with a head 15, and voice coil motor (VCM) 14. The disk 10 is attached to the spindle motor 12, and is rotated by the drive of the spindle motor 12. The arm 13 and the VCM 14 form an actuator. The actuator moves the head 15 on the arm 13 to a certain position on the disk 10 through the drive of the VCM 14. There may be two or more of the disks 10 and the heads 15. Hereinafter, data to be written to each component such as the disk 10 of the magnetic disk device 1 or an external device may be referred to as write data, and data to be read from, for example, the disk 10 may be referred to as read data. Write data may be simply referred to as data, read data may be simply referred to as data, and write and read data may be referred to as data.

In the recording area of the disk 10, a shingled magnetic recording (SMR) area 10s and a media cache area 10m are assigned. Hereinafter, a direction along the circumference of the disk 10 will be referred to as circumferential direction, and a direction orthogonal to the circumferential direction will be referred to as radius direction. A particular position of a particular circumferential direction of the disk 10 will be a circumferential position, and a particular position of a particular radius direction of the disk 10 will be referred to as radius position. Furthermore, the radius position and the circumferential position may be simply referred to as positions.

In the shingled magnetic recording area 10s, user data or the like will be recorded in response to a write request from the host 100. The media cache area 10m will be used as a cache of the shingled magnetic recording area 10s. In the shingled magnetic recording area 10s, a track to be written next will be overwritten in a part of a track. Here, overwriting of data includes writing data over a part of two or more data. In other words, overwriting of data includes shifting and overwriting data with respect to one of two or more data. Thus, track density (track per inch: TPI) if the shingled magnetic recording area 10s becomes higher than the track density of a recording area which is not overwritten. In the shingled magnetic recording area 10s, a plurality of track groups each including a plurality of tracks continuously overwritten in one direction in the radius direction are arranged at intervals (gaps) therebetween. Hereinafter, the track groups including the tracks continuously overwritten in one direction of the radius direction will be referred to as band area. The band area includes at least one track to which an adjacent track in the radius direction (which will be referred to as adjacent track) is overwritten in a part thereof and a track overwritten for the last time (last track). The last track has a wider width of the track in the radius direction (which may be referred to as track width) as compared to a track part of which is overwritten since the last track is not partly overwritten. Note that, in the shingled magnetic recording area 10s, data may be written in an ordinary recording format which is different from the shingled magnetic recording format. Hereinafter, the term "track" means, for example, one area in divided areas of the disk 10 in the radius direction, data written along the circumferential direction of the disk 10, and path around the circumferential direction of the disk 10. The track includes a plurality of sectors. The term "sector" means, for example, one area in areas of a track divided along the circumferential direction, and data written in one area of areas of a track divided in the circumferential direction. A width of the track in the radius direction will be referred to as track width. The central position of the track width in a particular circumferential position of a particular track will be referred to as track center, or a path passing through the center of a track width of a particular track will be referred to as track center. Furthermore, a written track will be referred to as write track. An area of remaining write tracks excluding the area in which adjacent track is overwritten may be referred to as read track. Furthermore, a write track may be simply referred to as track, and a read track may be simply referred to as track, and the write track and the read track may be referred to as tracks. A width of the write track in the radius direction may be referred to as write track width, and a width of the read track in the radius direction may be referred to as read track width. The write track width and the read track width may be referred to as track widths.

The head 15 includes a write head 15W and a read head 15R mounted on a slider which is a main body thereof. The write head 15W writes data to the disk 10. For example, the write head 15W writes a particular track in the disk 10. The write head 15W includes a plurality of write heads, for example, two write heads 15W1 and 15W2. The write head 15W1 is, of the write heads, positioned to be closest to the read head 15R. The write head 15W2 is positioned, for example, at a position second closest to the read head 15R as compared to the write head 15W1. In other words, the write head 15W1 is positioned between the read head 15R and the write head 15W2. Note that the write head 15W may include three or more write heads. In the following description, one of the write heads of one head 15, for example, the write head 15W1 or 15W2 may be referred to as write head 15W, or two write heads 15W1 and 15W2 may be referred to as write heads 15W. The read head 15R reads data recorded in the disk 10. For example, the read head 15R reads a particular track of the disk 10.

FIG. 2 is a schematic view of an example of arrangement of the head 15 with respect to the disk 10 of the present embodiment. As in FIG. 2, a direction to the outer periphery of the disk 10 in the radius direction will be referred to as an outer direction (outside) and a direction opposite to the outer direction will be referred to as an inner direction (inside). Furthermore, as in FIG. 2, in the circumferential direction, a direction of the rotation of the disk 10 will be referred to as rotation direction. Note that, in the example of FIG. 2, the rotation direction is clockwise; however, it may be opposite (counterclockwise). In FIG. 2, the shingled magnetic recording area 10s is divided into the inner periphery area IR positioned in the inner direction, outer periphery area OR positioned in the outer direction, and middle periphery area MR positioned between the inner periphery area IR and the outer periphery area OR. In the example of FIG. 2, a radius position IRP, radius position RP0, and radius position ORP are shown. The radius position IRP is positioned in the inner direction than the radius position RP0, and the radius position ORP is positioned in the outer direction than the radius position RP0. In the example of FIG. 2, the radius position RP0 is included in the middle periphery area MR, the radius position ORP is included in the outer periphery area OR, and the radius position IRP is included in the inner periphery area IR. Note that the radius position RP0 may be included in the outer periphery area OR, or may be included in the inner periphery area IR. The radius position IRP and ORP each may be included in the middle periphery area MR. In the example of FIG. 2, a track center IIL, track center ILO, and track center OIL are shown. The track center IIL is positioned in the inner direction than the track center ILO, and the track center OIL is positioned in the outer direction than the track center ILO. In the example of FIG. 2, the track center ILO is a path passing the center of a particular track of the middle periphery area MR, the track center OIL is a path passing the center of a particular track of the outer periphery area OR, and the track center IIL is a path passing the center of a particular track of the inner periphery area IR. The track centers IIL, ILO, and OIL are positioned concentrically with respect to the disk 10. For example, the track centers IIL, ILO, and OIL are arranged in a perfect circle manner. Note that the track centers IIL, ILO, and OIL may not be arranged circularly, and may be arranged in a wave form manner varying in the radius direction of the disk 10. In FIG. 2, the radius position IRP corresponds to the track center IIL of a particular track of the inner periphery area IR, the radius position RP0 corresponds to the track center ILO of a particular track of the middle periphery area MR, and the radius position ORP corresponds to the track center OIL.

If the head 15 is positioned in the radius position RP0, a skew angle becomes, for example, 0°. In the following description, the radius position RP0 may be referred to as a reference position RP0. If the head 15 is positioned in the radius position ORP, the skew angle is, for example, a positive value. While the head 15 moves from the reference position RP0 to the outer direction in the radius direction, the absolute value of the skew angle increases. If the head 15 is positioned in the radius position IRP, the skew angle is, for example, a negative value. While the head 15 moves from the reference position RP0 to the inner direction in the radius direction, the absolute value of the skew angle increases. Note that, if the head 15 is positioned in the radius position ORP, the skew angle may be a negative value. Furthermore, if the head 15 is positioned in the radius position IRP, the skew angle may be a positive value.

The disk 10 includes a plurality of servo data areas SV. In the following description, the servo data area SV may be referred to servo pattern SV. The servo data areas SV are scattered extending radially in the radius direction of the disk 10 at certain intervals in the circumferential direction. The servo data area SV includes a plurality of servo sectors. Between two servo data areas SV continuously arranged in the circumferential direction, user data or the like will be written. In a certain track, an area between two servo data areas SV to which user data are written may be referred to as a data unit. For example, a sector includes a servo sector and a data unit connected to the servo sector.

FIG. 3 is a schematic diagram illustrating an example of the structure of the sector SC. In FIG. 3, a direction of read/write (direction in which the head 15 moves) in the circumferential direction will be referred to as read/write direction. The read/write direction corresponds to the direction in which the head 15 moves. Furthermore, the read/write direction corresponds to, for example, a direction opposite to the rotation direction of FIG. 2. The front direction corresponds to the direction of data read/written, and the rear direction corresponds to the direction to be read/written. In the following description, the front direction may be simply referred to as front or forward, and the rear direction may be simply referred to as rear.

In the example of FIG. 3, the sector SC includes a servo sector SS and a data unit DTP. The servo sector SS corresponds to the servo data areas SV in a certain track. The servo sector SS includes servo data to position the head 15 to a particular radius position of the disk 10, for example, a particular track.

The servo data include, for example, preamble, servo mark, gray code, PAD, burst data, and post code. Note that the servo sector SS may not include the post code. The preamble, servo mark, gray code, PAD, burst data, and post code are continuously arranged in this order toward the tip of the arrow mark of the read/write direction. The preamble includes preamble data to synchronize with a resume signal of the servo pattern including the servo mark and the gray code. The servo mark includes servo mark data indicative of a start of the servo pattern. The gray code includes an address (cylinder address) of a particular track and an address of a servo sector of a particular track. The burst data are data to be used to detect a positional shifting (positional error) of the head 15 with respect to the track center of a particular track in the radius direction and/or circumferential direction (relative positional data), and include repeated patterns repeated for certain periods. PAD includes PAD data of synchronization signals such as gap and servo AGC. The burst data include, for example, N burst and Q burst. The post code includes data to correct an error caused by a track distortion between the disk 10 and the concentric track center (target path), which occurs when the servo data are written to the disk 10 and blurring synchronizing with the rotation of the disk 10 (repeated runouts: RRO) happens (in the following description, the data will be referred to as RRO correction data).

FIG. 4 is a schematic diagram illustrating an example of the shingled magnetic recording area 10s in which data are written. FIG. 4 only illustrates components necessary for the explanation. In the radius direction of FIG. 4, the direction in which the track is overwritten will be referred to as the shingled magnetic recording direction. In FIG. 4, the shingled magnetic recording direction is the inner direction. Note that the shingled magnetic recording direction may be the outer direction.

In the example of FIG. 4, the shingled magnetic recording area 10s includes a band area TGn. In FIG. 4, each track in the band area TGn extends in a straight shape for the convenience of explanation. Actually, each track in the band area TGn is in a concentric shape curved along the shape of the disk 10. That is, actually, an end of the front direction and an end of the rear direction of each track match in the band area TGn. Furthermore, in each track of the band area TGn, actually, a shift or the like occurs because of disturbance or other structural influences. Note that the shingled magnetic recording area 10s may include two or more band areas.

In the example of FIG. 4, the band area TGn includes a write track WTn, WTn+1, WTn+2, WTn+3, and WTn+4. The write tracks WTn and WTn+1 partly overlap with each other. The write tracks WTn+1 and WTn+2 partly overlap with each other. The write track WTn+2 and WTn+3 partly overlap with each other. The write track WTn+3 and WTn+4 partly overlap with each other. In the band area TGn, the write tracks WTn to WTn+4 are overwritten in the radius direction in this order. Note that, in this example, the band area TGn includes five tracks; however, the band area TGn may include tracks less than five or may include tracks more than five.

The write track WTn includes a track edge EnA and track edge EnB. In the example of FIG. 4, the track edge EnA is an end of the write track WTn in the outer direction, and the track edge EnB is an end of the write track WTn in the inner direction (shingled magnetic recording direction). The write track WTn+1 includes a track edge En+1A and a track edge En+1B. In the example of FIG. 4, the track edge En+1A is an end of the write track WTn+1 in the outer direction and the track edge En+1B is an end of the write track WTn+1 in the inner direction (shingled magnetic recording direction). The write track WTn+2 includes a track edge EN+2A and a track edge En+2B. In the example of FIG. 4, the track edge En+2A is an end of the write track WTn+2 in the outer direction, and the track edge En+2B is an end of the write track WTn+2 in the inner direction (shingled magnetic recording direction). The write track WTn+3 includes a track edge En+3A and a track edge En+3B. In the example of FIG. 4, the track edge En+3A is an end of the write track WTn+3 in the outer direction, and the track edge En+3B is an end of the write track WTn+3 in the inner direction ID (shingled magnetic recording direction). The write track (last track) WTn+4 includes a track edge En+4A and a track edge En+4B. In the example of FIG. 4, the track edge En+4A is an end of the write track WTn+4 in the outer direction and the track edge En+4B is an end of the write track WTn+4 in the inner direction (shingled magnetic recording direction).

A write track width WWn of a write track WTn is a length between the track edges EnA and EnB in the radius direction. A write track width WWn+1 of the write track WTn+1 is a length between the track edges En+1A and En+1B in the radius direction. A write track width WWn+2 of the write track WTn+2 is a length between the track edges En+2A and En+2B in the radius direction. A write track width WWn+3 of the write track WTn+3 is a length between the track edges En+3A and En+3B in the radius direction. A write track width WWn+4 of the write track WTn+4 is a length between the track edges En+4A and En+4B in the radius direction. The write track widths WWn to WWn+4 are, for example, equal. Note that the write track widths WWn to WWn+4 may be different from each other.

The read track RTn is an area of the write track WTn excluding the part where the write track WTn+1 is overwritten. The read track RTn+1 is an area of the write track WTn+1 excluding the part where the write track WTn+2 is overwritten. The read track RTn+2 is an area of the write track WTn+2 excluding the part where the write track WTn+3 is overwritten. The read track RTn+3 is an area of the write track WTn+3 excluding the part where the write track WTn+4 is overwritten. The read track RTn+4 corresponds to the write track WTn+4. The read track RTn+4 corresponds to the last track in the band area TGn.

A read track width RWn of a read track RTn is a length between the track edges EnA and En+1A in the radius direction. A read track width RWn+1 of the read track RTn+1 is a length between the track edges En+1A and En+2A in the radius direction. A read track width RWn+2 of the read track RTn+2 is a length between the track edges En+2A and En+3A in the radius direction. A read track width RWn+3 of the read track RTn+3 is a length between the track edges En+3A and En+4A in the radius direction. A read track width RWn+4 of the read track RTn+4 is a length between the track edges En+4A and En+4B in the radius direction. That is, the read track width RWn+4 is equal to the write track width WWn+4.

FIG. 5 is a plan view schematically illustrating an example of a geometrical arrangement of two write heads 15W1 and 15W2 and the read head 15R of the present embodiment. FIG. 5 only illustrates components necessary for the explanation. FIG. 5 illustrates the write head 15W1, write head 15W2, and read head 15R. The write head 15W1 includes an end WE11 of a side extending in the direction crossing the radius direction, end WE12 positioned to be opposite to the end WE11 in the radius direction, and center WC1. A width WW1 of the write head 15W1 in the radius direction corresponds to a gap between the ends WE11 and WE12. Hereinafter, the width of the write head 15W in the radius direction will be simply referred to as width of the write head 15W. The write head 15W2 includes an end WE21 of a side extending in the direction crossing the radius direction, end WE22 positioned to be opposite to the end WE21 in the radius direction, and center WC2. The width WW2 of the write head 15W2 corresponds to a gap between the ends WE21 and WE22. In the example of FIG. 5, the width WW2 of the write head 15W2 is greater than the width WW1 of the write head 15W1. In other words, the write head 15W2 is greater than the write head 15W1.

FIG. 5 illustrates an middle point MC positioned in the middle part of the line connecting the center WC1 of the write head 15W1 and the center WC2 of the write head 15W2. For convenience of explanation, the center of a write head, middle point between two write heads of multiple write heads, and each component of a write head may simply be referred to as write head, and center of a read head and each component of a read head may simply be referred to as read head. In the following description, the explanation will be described given that data are written by arranging the middle point MC to the track center of the track to which the data are written. Note that data may be written by arranging the write head 15W1 or the write head 15W2 to the track center of the track to which the data are written. Furthermore, data may be written by arranging the middle point MC, write head 15W1, or write head 15W2 to a path other than the track center of the track to which the data are written. In the following description, a gap between the write head 15W1 and the write head 15W2 in the circumferential direction may be referred to as down track separation (DTS). A gap between the write heads 15W1 and 15W2 in the radius direction may be referred to as cross track separation (CTS).

In the example of FIG. 5, the middle point MC is positioned in the reference position RP0. If the middle point MC is positioned in the reference position RP0, the write head 15W1, middle point MC, write head 15W2, and read head 15R are arranged along the circumferential direction. In that case, the write head 15W1 and the write head 15W2 are not shifted in the radius direction. That is, the cross rack separation CP0 in a case where the middle point MC is positioned to the reference position RP0 is 0. If the middle point MC is positioned to the reference position RP0 is set to the reference position RP0, the write head 15W1 and the read head 15R are not shifted in the radius direction. Furthermore, if the middle point MC is set to the reference position RP0, the write head 15W2 and the read head 15R are not shifted in the radius direction. If the middle point MC is set to the reference position RP0, the write head 15W1 and the read head 15R may be shifted in the radius direction. Furthermore, if the middle point MC is set to the reference position RP0, the write head 15W2 and read head 15R may be shifted in the radius direction.

In the example of FIG. 5, if the middle point MC is positioned to the reference position RP0, the write head 15W1 and write head 15W2 are apart from each other in the circumferential direction with the down track separation SP0. In the following description, the down track separation SP0 in a case where the write heads 15W1 and 15W2 are arranged in the circumferential direction may be referred to as a reference down track separation SP0.

Figure 6:
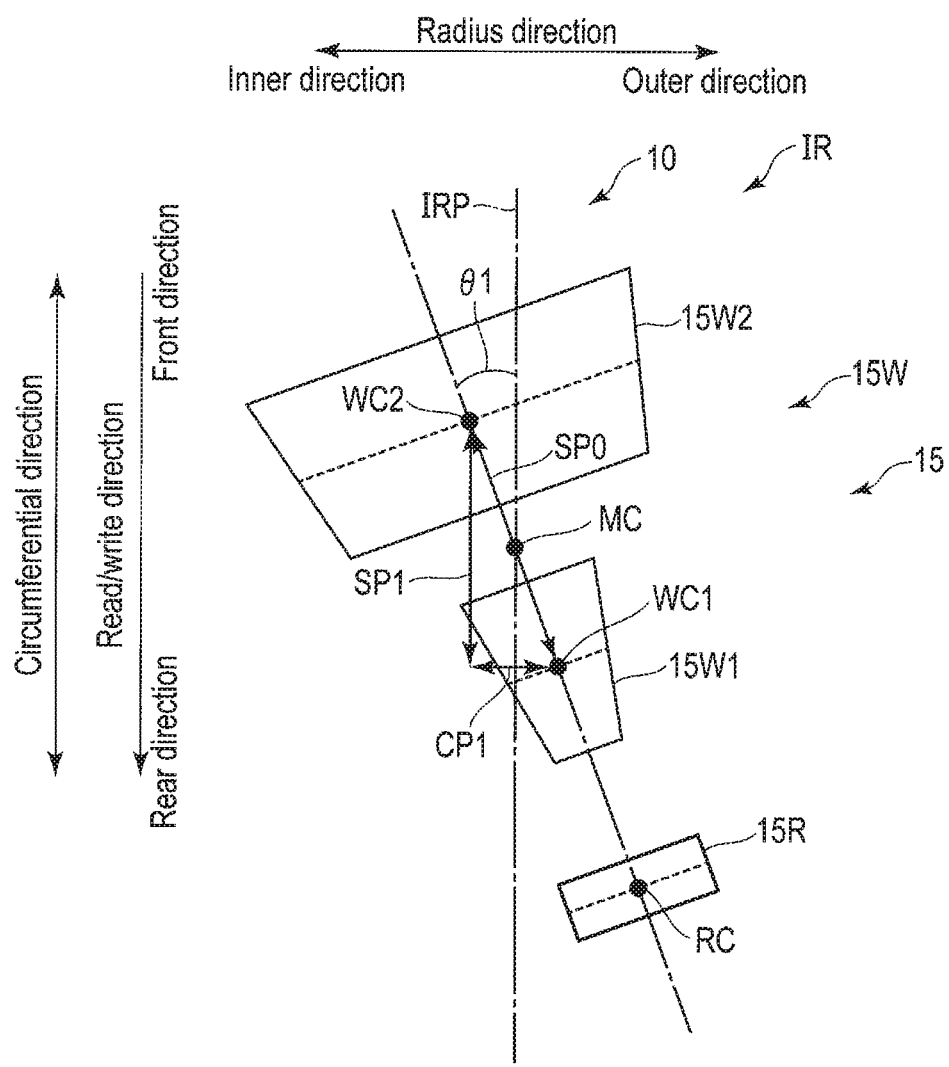
FIG. 6 is a plan view schematically illustrating an example of geometrical arrangement of two write heads and a read head of the first embodiment.

FIG. 6 is a plan view schematically illustrating an example of a geometric arrangement of two write heads 15W1 and 15W2 and a read head 15R of the present embodiment. FIG. 6 only illustrates components necessary for the explanation.

In the example of FIG. 6, the middle point MC is set to the radius position IRP. In other words, the head 15 is set to the radius position corresponding to a skew angle θ1 in the inner direction than the reference position RP0. If the middle point MC is set to the radius position IRP, the write head 15W1, middle point MC, write head 15W2, and read head 15R are inclined to the inner direction with respect to the straight line passing the radius position IRP at the skew angle θ1. In that case, the write heads 15W1 and 15W2 are shifted in the radius direction with the cross track separation CP1. The cross track separation CP1 can be calculated based on, for example, the skew angle 81 and the reference down track separation SP0. If the middle point MC is set to the radius position IRP, the write head 15W1 and the read head 15R are shifted in the radius direction. Furthermore, if the middle point MC is set to the radius position IRP, the write head 15W2 and the read head 15R are shifted in the radius direction. Note that, if the middle point MC is set to the radius position IRP, the write head 15W1 and the read head 15R may not be shifted in the radius direction. If the middle point MC is set to the radius position IRP, the write head 15W2 and the read head 15R may not be shifted in the radius direction.

In the example of FIG. 6, if the middle point MC is set to the radius position IRP, the write heads 15W1 and 15W2 are apart from each other in the circumferential direction with the down track separation SP1. The down track separation SP1 can be calculated based on, for example, the skew angle θ1 and the reference down track separation SP0.

Note that, if the middle point MC is set to the radius position ORP, as in the case where the middle point MC is set to the radius position IRP, the write head 15W1, middle point MC, write head 15W2, and read head 15R are inclined in the outer direction with respect to the straight line passing the radius position ORP at a certain skew angle. In that case, the write heads 15W1 and 15W2 are shifted in the radius direction at a certain cross track separation. The cross track separation can be calculated based on, for example, a certain skew angle and the reference down track separation SP0. If the middle point MC is set to the radius position ORP, the write head 15W1 and the read head 15R are shifted in the radius direction. Note that, if the middle point MC is set to the radius position ORP, the write head 15W2 and the read head 15R may not be shifted in the radius direction. If the middle point MC is set to the radius position ORP, the write head 15W2 and the read head 15R may not be shifted in the radius direction. If the middle point MC is set to the radius position ORP, the write heads 15W1 and 15W2 are apart from each other in the circumferential direction with a certain down track separation. The down track separation can be calculated based on, for example, a skew angle and the reference down track separation SP0.

The driver IC 20 controls the drive of SPM 12 and VCM 14 according to the control of the system controller 130 (specifically, by the control of MPU 60 which will be described later).

The head amplifier IC (preamplifier) 30 includes a read amplifier and a write driver. The read amplifier amplifies a read signal read from the disk 10 and outputs to the system controller (specifically, to a read/write (R/W) channel 40 which will be described later). The write driver outputs write current corresponding to the write data output from the R/W channel 40.

The volatile memory 70 is a semiconductor memory data of which are lost when a power supply thereto is cut. The volatile memory 70 stores data necessary for processing in each component in the magnetic disk device 1. The volatile memory 70 is, for example, dynamic random access memory (DRAM), or a synchronous dynamic random access memory (SDRAM).

The nonvolatile memory 80 is a semiconductor memory data of which are kept even when a power supply thereto is cut. The nonvolatile memory 80 is, for example, a flash read only memory (FROM) of NOR or NAND type.

The buffer memory 90 is a semiconductor memory which temporarily stores, for example, data to be exchanged between the magnetic disk device 1 and the host 100. Note that the buffer memory 90 may be formed integrally with the volatile memory 70. The buffer memory 90 is, for example, DRAM, static random access memory (SRAM), SDRAM, ferroelectric random access memory (FeRAM), or magnetoresistive random access memory (MRAM).

The system controller (controller) 130 is realized using a large scale integrated circuit (LSI) which is, for example, a system-on-a-chip (SoC) including a plurality of devices are integrated on a single chip. The system controller 130 includes a read/write (R/W) channel 40, hard disk controller (HDC) 50, and microprocessor (MPU) 60. The R/W channel 40, HDC 50, and MPU 60 are electrically connected to each other. The system controller 130 is electrically connected to, for example, the driver IC 20, head amplifier IC 30, volatile memory 70, nonvolatile memory 80, buffer memory 90, and host system 100.

The R/W channel 40 executes, upon receipt of an instruction from the MPU 60 which will be described later, signal processing of read data transferred from the disk 10 to the host 100 and write data transferred from the host 100. The R/W channel 40 includes a circuit or a function to measure signal quality of the read data. The R/W channel 40 is electrically connected to, for example, the head amplifier IC 30, HDC 50, and MPU 60.

The HDC 50 controls the data transfer between the host 100 and the R/W channel 40 upon receipt of an instruction from the MPU 60 which will be described later. The HDC 50 is electrically connected to, for example, the R/W channel 40, MPU 60, volatile memory 70, nonvolatile memory 80, and buffer memory 90.

The MPU 60 is a main controller controlling each component of the magnetic disk device 1. The MPU 60 controls the VCM 14 through the driver IC 20, and executes a servo control to position the head 15. The MPU 60 controls the SPM 12 through the driver IC 20, and rotates the disk 10. The MPU 60 controls a data write operation to the disk 10, and selects a storage for the write data transferred from the host 100. Furthermore, the MPU 60 controls a data read operation from the disk 10, and controls processing of read data transferred from the disk 10 to the host 100. The MPU 60 is connected to each component of the magnetic disk device 1. The MPU 60 is electrically connected to, for example, the driver IC 20, R/W channel 40, and HDC 50.

The MPU 60 includes a correction value calculator 610 and a write controller 620. The MPU 60 executes processing of each component, for example, correction value calculator 610 and write controller 620 on a firmware. Note that the MPU 60 may include such components, for example, the correction value calculator 610 and the write controller 620 as circuits.

The correction value calculator 610 calculates a correction value (hereinafter referred to as overwrite correction value) which corrects a timing of overwriting (hereinafter may be referred to as overwrite timing) data (hereinafter referred to as overwrite data) on data (base data) written in a radius area by a certain write head 15W using a different write head 15W. The overwrite correction value corresponds to a timing of overwriting the overwrite data on the base data while aligning data patterns in the circumferential direction (hereinafter referred to as data pattern), circumferential positions, or phases of both the base data and the overwrite data in the circumferential direction. In other words, the overwrite correction value corresponds to a timing of overwriting the overwrite data on the base data while matching the data pattern, circumferential position, or phase of the overwrite data with the data pattern, circumferential position, or phase of the base data with or without a shifting which can be tolerable. Here, overwriting data means not only writing other data within a width of the radius direction of one of two or more data (hereinafter referred to as data width) but also writing other data over a part of one of two or more data such that it can be regarded that the other data are practically written within the data width of the one data. In other words, overwriting data includes writing other data with respect to one of two or more data such that the other data are not shifted. Furthermore, overwriting data means not only writing other data to one of two or more data such that the one data are positioned within the data width of the other data but also writing other data over a part of one of two or more data such that it can be regarded that the one data are practically positioned within the data width of the other data. In other words, overwriting data means writing other data over one of two or more data such that the one data are not shifted with respect to the other data. In the following description, for easier understanding, a state where the data pattern, circumferential position, or phase of certain data is matched with the data pattern, circumferential position, or phase of other data, and a state where the data pattern, circumferential position, or phase of certain data are regarded to be practically matched with the data pattern, circumferential position or phase of the other data with a tolerable shifting will be described as "the data pattern, circumferential position, or phase of certain data are matched with the data pattern, circumferential position, or phase of other data". Note that the correction value calculator 610 may not calculate an overwrite correction value if the data pattern, circumferential position, or phase of the base data match with the data pattern, circumferential position, or phase of the overwrite data when overwriting the overwrite data on the base data at a current overwrite timing.

The base data correspond to, for example, data first written to a certain position on the disk 10 in a write process executed by a command or the like. In other words, the base data correspond to data preliminarily written to a radius area to which designated data are written by a command or the like. The overwrite data correspond to, for example, data overwritten to the base data or the overwrite data.

The base data correspond to, for example, data written in write current (or recording magnetic field) of 15 T frequency if a maximum magnetization reverse interval is 1 T. The overwrite data correspond to, for example, data written in a frequency of write current (or recording magnetic field) higher than a frequency of write current (or recording magnetic field) when the base data are written. Note that the overwrite data may be data written in a frequency of write current (or recording magnetic field) lower than a frequency of write current (or recording magnetic field) when the base data are written.

The base data include data which are the same as or are regarded to be practically the same as the data included in the overwrite data. For example, a result from writing or reading the base data can be regarded as the same or to be practically the same as a result from writing or reading the overwrite data. If the data included in the base data are the same as or are regarded to be practically the same as the data included in the overwrite data, it may be described as "the base data and the overwrite data are the same". Note that the base data may include data which are different from the data included in the overwrite data. In other words, the base data and the overwrite data may be different.

For example, the correction value calculator 610 calculates an overwrite correction value based on a liner velocity of the down track separation and the head 15 in the circumferential direction (hereinafter may be referred to as linear velocity). For example, the correction value calculator 610 calculates the overwrite correction value by dividing the down track separation with the linear velocity (down track separation/linear velocity). The linear velocity corresponds to, for example, the rotation speed of the disk 10. In the following description, the overwrite correction value calculated based on the down track separation and the linear velocity may be referred to as a logical correction value.

For example, the correction value calculator 610 calculates an overwrite correction value based on, for example, a waveform of reading base data (hereinafter may be referred to as base data read waveform) and a waveform of reading overwrite data (hereinafter may be referred to as overwrite data read waveform). In the following description, an overwrite correction value calculated based on the base data read waveform, the overwrite data read waveform, and the like may be referred to as a measured correction value. Note that the correction value calculator 610 may calculate a measured correction value based on the base data read waveform, overwrite data read waveform, down track separation, and the like.

Note that the correction value calculator 610 may calculate an overwrite correction value (measured correction value) at a timing of overwriting corrected based on a base data read waveform and a logical correction value, using the read waveform of data overwritten on the base data and the down track separation. In the following description, the logical correction value may be referred to as an overwrite correction value, or a measured correction value may be referred to as an overwrite correction value, and a logical correction value and a measured correction value may be referred to as overwrite correction values. The correction value calculator 610 may calculate an overwrite correction value in each radius area, for example, each zone or each track and store the overwrite correction value corresponding to each calculated radius area in a certain recording area, for example, media cache 10m of the disk 10 or the nonvolatile memory 80 as a table.

The writ controller 620 controls a write process of data. The write controller 620 executes a process of overwriting overwrite data on base data written in a radius area by a certain write head 15W using a different write head 15W (hereinafter may be referred to as overwrite process). For example, the write controller 620 writes base data in a radius area by a certain write head 15W, and immediately after that, overwrites overwrite data on the base data using a different write head 15W. In other words, the write controller 620 writes base data by a certain write head 15W and then overwrites overwrite data on the base data by a different write head 15W. Note that the write controller 620 may overwrite overwrite data on the base data by a different write head 15W (hereinafter may be referred as first overwrite data) and may further overwrite overwrite data on the first overwrite data by another different write head 15W (hereinafter may be referred to as second overwrite data). With overwriting the second overwrite data on the first overwrite data as above, the recording quality of second overwrite data may be improved.

The write controller 620 determines, at the time of executing the overwrite process in a radius area, whether or not the current overwrite timing is adjusted (or corrected). If it is determined that the current overwrite timing is adjusted at the time of executing the overwrite process in the radius area, the write controller 620 acquires an overwrite correction value corresponding the radius area from a certain recording area, for example, the media cache 10m of the disk 10 or the nonvolatile memory 80, adjusts the current overwrite timing based on the overwrite correction value, and executes the overwrite process at the overwrite timing adjusted based on the overwrite correction value. The write controller 620 determines that the overwrite timing should be adjusted if, at the time of overwriting overwrite data on base data at the current overwrite timing in the radius area, the data pattern of the base data does not match the data pattern of the overwrite data written based on the current overwrite timing. For example, the write controller 620 determines that the overwrite timing should be adjusted if, at the time of executing an overwrite process in a radius area, an overwrite correction value corresponding to the radius area is acquired.

If it is determined that the current overwrite timing is not adjusted at the time of executing an overwrite process in a radius area, the write controller 620 executes the overwrite process based on the current overwrite timing. The write controller 620 determines that the overwrite timing should not be adjusted if, for example, at the time of overwriting overwrite data on base data at the current overwrite timing in a radius area, the data pattern of the base data and the data pattern of overwrite data written based on the current overwrite timing are determined to match with each other. For example, the write controller 620 determines that the overwrite timing should not be adjusted if, at the time of executing the overwrite process in the radius area, an overwrite correction value corresponding to the radius area is not acquired.

For example, the write controller 620 determines, at a time of overwriting overwrite data on base data by a write head 15W2 immediately after the base data are written in a radius area by a write head 15W1, whether or not the current overwrite timing of the overwriting by the write head 15W2 is adjusted. If it is determined that the current overwrite timing to overwrite overwrite data by the write head 15W2 on the base data written by the write head 15W1 in the radius area is adjusted, the write controller 620 overwrites the overwrite data on the base data at the adjusted overwrite timing based on the overwrite correction value corresponding to the radius area.

For example, the write controller 620 determines, at a time of overwriting overwrite data on base data by a write head 15W2 immediately after the base data are written in a radius area by a write head 15W1, whether or not the current overwrite timing of the overwriting by the write head 15W2 is adjusted. If it is determined that the current overwrite timing to overwrite the overwrite data by the write head 15W2 on the base data written by the write head 15W1 in the radius area is adjusted, the write controller 620 overwrites the overwrite data on the base data at an overwrite timing which is delayed from the timing of writing the base data by the write head 15W1 (hereinafter will be referred to as base timing) by the overwrite correction value, for example, the down track separation.

The write controller 620 executes the shingled magnetic recording. For example, the write controller 620 executes the shingled magnetic recording by changing (or setting) a shingled magnetic recording direction in accordance with a radius area or a radius position by which the head 15 is positioned. In other words, the write controller 620 executes the shingled magnetic recording by changing the shingled magnetic recording direction based on a skew angle of the head 15. The write controller 620 executes the shingled magnetic recording in a certain shingled magnetic recording direction such that the area of the overwrite data overwritten on the base data (hereinafter may be referred to as overwrite area) can be readably kept in a radius area, for example, a certain zone, certain band area, or certain track. In other words, in order to keep at least part of the overwrite area of a certain track in a certain band area as a read track, the write controller 620 overwrite another track on the track in a certain shingled magnetic recording direction. Note that the write controller 620 may overwrite another track to cover the overwrite area of a certain track in a certain band area in a certain shingled magnetic recording direction of the track. In other words, the write controller 620 may overwrite another track on a certain track in a certain band area in a certain shingled magnetic recording direction of the track such that the overwrite area of the track does not remain as a read track.

In the following description, in the head 15, head amplifier IC 30, system controller 130 (R/W channel 40, HDC 50, MPU 60, and the like), volatile memory 70, nonvolatile memory 80, buffer memory 90, and the like, a system executing a read process will be referred to as read system, and a system executing a write process will be referred to as a write system.

FIG. 7 is a block diagram illustrating a structural example of a read/write system of the present embodiment.

The head amplifier IC 30 includes a preamplifier (read amplifier) 311 as a read system. The preamplifier 311 amplifies a read signal of read data read from the disk 10 by the read head 15R.

The head amplifier IC 30 includes a driver (write driver) 321 and a driver (write driver) 322. The driver 321 includes, for example, a write current generation circuit 3211. The write current generation circuit 3211 generates write current based on, for example, write data or a write signal corresponding to the write data. The driver 322 includes, for example, a write current generation circuit 3221. The write current generation circuit 3221 generates write current based on, for example, write data or a write signal corresponding to the write data. Note that, in the example of FIG. 7, the head amplifier IC 30 includes two drivers 321 and 322 (or two write current generation circuits 3211 and 3221); however, it may include only one driver or three or more drivers in accordance with the number of write heads included in the write head 15W.

The R/W channel 40 includes an input circuit 411 and a decoder 412 as a read system. The input circuit 411 executes a signal process to read data, for example. The decoder 412 executes a decode process to read data, for example.

The R/W channel 40 includes, as a write system, an encoder 421, encoder 422, delay circuit 423, driver (write driver) 424, and driver (write driver) 425. The encoders 421 and 422 each execute an encode process with respect to write data WDATA. The encoders 421 and 422 execute an encode process with respect to write data in accordance with a signal DSEL, or outputs write data to which the encode process is performed (hereinafter may be referred to as encoded data). Through executing the encode process to the write data in accordance with the signal DSEL or outputting the encoded data, the encoders 421 and 422 can output encoded data having frequencies of signals which are synchronized. The delay circuit 423 generates encoded data in which frequency of signal is delayed based on a delay signal (or signal corresponding to overwrite correction value) DELAY, which may be referred to as delay data in the following description. In other words, the delay circuit 423 generates encoded data (delay data) a timing of which is shifted based on the delay signal DELAY. The driver 424 includes, for example, a write signal generation circuit 4241. The write signal generation circuit 4241 generates, for example, write data (encoded data and delay data) to which a signal process to generate write current is executed (hereinafter may be referred to as write current data), or write signal to generate write current corresponding to write data (encoded data and delay data) (hereinafter may be referred to as write current signal). The driver 425 includes, for example, a write signal generation circuit 4251. The write signal generation circuit 4251 generates, for example, write current data to which a signal process to generate write current in the write data (encoded data and delay data), or a write current signal corresponding to the write data (encoded data and delay data).

In the read system, the read head 15R reads, for example, base data written by the write head 15W1 in a certain position of the disk 10 and overwrite data overwritten on the base data by the write head 15W2. The read head 15R may read the base data written by the write head 15W1 on a certain position of the disk 10 and the overwrite data overwritten on the base data by the write head 15W2 at the same time or separately. The read head 15R outputs the base data read (hereinafter may be referred to as base read data) and overwrite data overwritten on the base data (hereinafter may be referred to as overwrite read data) to the preamplifier 311. The preamplifier 311 amplifies the base read data and the overwrite read data input from the read head 15R and outputs the amplified data to the input circuit 411. The input circuit 411 executes a signal process to the base read data and the overwrite read data input from the preamplifier 311, and outputs the data to the decoder 412. The decoder 412 executes a decode process to the base read data and the overwrite read data input from the input circuit 411, and outputs the data to at least one of the HDC 50 and the MPU 60. To the HDC 50 or the MPU 60, for example, base read data to which the decoded process is executed (hereinafter may be referred to as base decoded data) RDATA and the overwrite read data to which the decode process is executed (hereinafter may be referred to as overwrite decoded data) RDATA are input. The HDC 50 or the MPU 60 may store the base decoded data and the overwrite decoded data in a certain recording area in each track or each zone, for example, volatile memory 70, nonvolatile memory 80, or media cache area 10m as a table.

In the write system, the HDC 50 or the MPU 60 generates (calculates), based on the base decoded data or the overwrite decoded data, the overwrite correction value (delay signal) DELAY. The HDC 50 or the MPU 60 outputs write data WDATA and signal DSEL input from the host 100 or the like to the encoders 421 and 422. The encoder 421 executes an encode process to the write data WDATA input from the HDC 50 or the MPU 60, and outputs the encoded data to at least one of the driver 424 and the delay circuit 423 based on the signal DSEL. The encoder 422 executes an encode process to the write data WDATA input from the HDC 50 or the MPU 60, and outputs the encoded data to the delay circuit 423 based on the signal DSEL. The delay circuit 423 delays the frequency of the signal of the encoded data input from the encoder 421 or 422, and outputs the delay data with the delayed frequency of the signal to the driver 425. In the driver 424, the write signal generation circuit 4241 generates a write current signal corresponding to the encoded data input from the encoder 421, and outputs the generated write current signal to the driver 321. In the driver 425, the write signal generation circuit 4251 generates a write current signal corresponding to the delay data input from the delay circuit 423, and outputs the generated write current signal to the driver 322. In the driver 321, the write current generation circuit 3211 generates write current based on the write current signal input from the driver 424, and outputs the generated write current to the write head 15W1. In the driver 322, the write current generation circuit 3221 generates write current based on the write current signal input from the driver 425, and outputs the generated write current to the write head 15W2. The write head 15W1 writes base data corresponding to the write current to a certain position of the disk 10. The write head 15W2 overwrites, immediately after the write head 15W1 writes the base data, overwrite data corresponding to the write current on the base data written by the write head 15W1.

Figure 8:
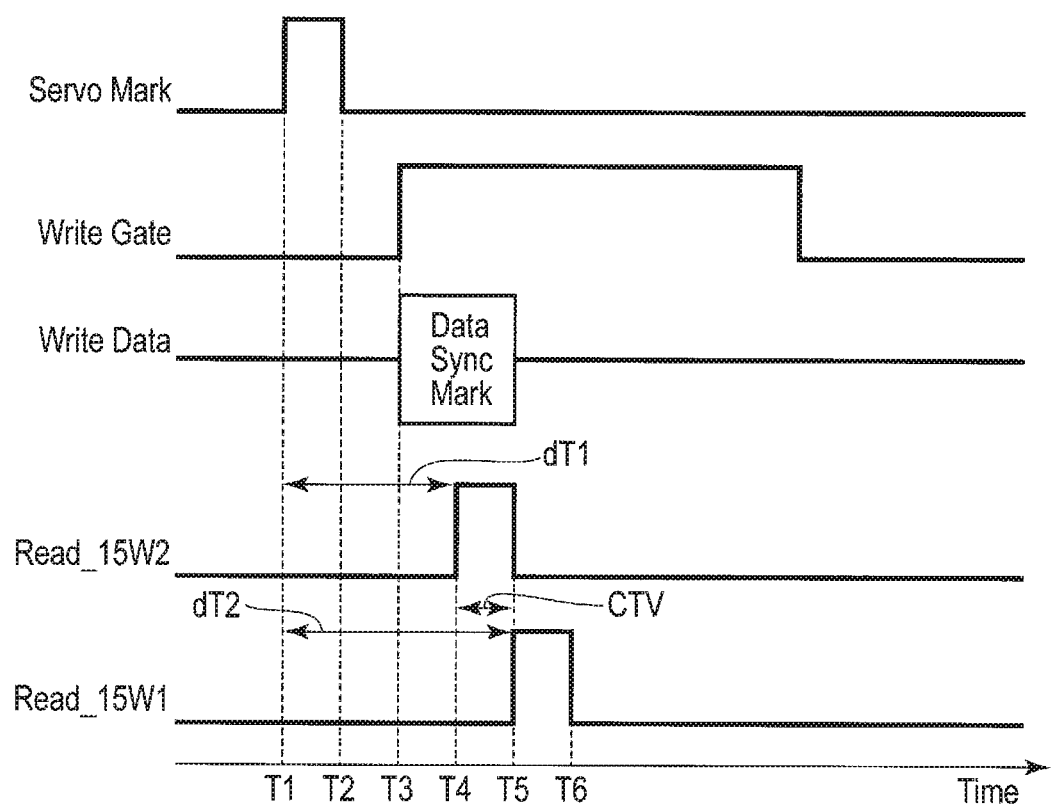
FIG. 8 is a timing chart illustrating an example of a calculation process of an overwrite correction value of the first embodiment.

FIG. 8 is a timing chart illustrating an example of a calculation process of an overwrite correction value of the present embodiment. FIG. 8 illustrates items of Servo Mark, Write Gate, Write Data, Read_15W1, and Read_15W2. Servo Mark indicates a timing of reading a servo mark of a certain servo sector SS of a certain track. Write Gate indicates a timing of rise and fall of a write gate. Write Data indicates a timing of reading a sync mark of write data (Data Sync Mark). Read_15W2 indicates a timing of reading data written by the write head 15W2 in a certain track with a certain time difference from the reading of the servo mark, for example, reading of overwrite data. Read_15W1 indicates a timing of reading data written by the write head 15W1 in a certain track with the same or practically the same time difference as a time difference between the reading of the servo mark and the writing of data by the write head 15W2, for example, reading of base data. In FIG. 8, the horizontal axis indicates a time and the time passes toward the tip of the arrow therein. The horizontal axis of FIG. 8 indicates timings T1, T2, T3, T4, T5, and T6. Timing T1 corresponds to a timing of rise of Servo Mark. Timing T2 corresponds to a timing of fall of Servo Mark. Timing T3 corresponds to a timing of rise of Write Gate and a timing of starting of read of Data Sync Mark. Timing T4 corresponds to a timing of rise of Read_15W2. Timing T5 corresponds to a timing of fall of Read_W2 and a timing of rise of Read_15W1. Timing T6 corresponds to a timing of fall of Read_15W1. FIG. 8 indicates a differential value CTV of timing T4 and timing T5.

In the example of FIG. 8, the correction value calculator 610 acquires timing T1 of reading a servo mark of a certain servo sector SS of a certain track, and after reading the servo mark, acquires timing T4 of reading data written by the write head 15W2 in a data unit continuous to the servo sector SS in the read/write direction, for example, overwrite data, and calculates a time difference dT1 from timing T1 and timing T4. The correction value calculator 610 acquires timing T1 of reading a servo mark of a certain servo sector SS of a certain track, and after reading the servo mark, acquires timing T5 of reading data written by the write head 15W1 in a data unit continuous to the servo sector SS in the read/write direction, for example, base data, and calculates a time difference dT2 from timing T1 and timing T5. The correction value calculator 610 calculates an overwrite correction value (logical correction value) to correct a differential value CTV of the time differences dT1 and dT2 based on the down track separation and the linear velocity. Note that the correction value calculator 610 may calculate the overwrite correction value based on the time differences dT1 and dT2.

Now, an example of a calculation process of an overwrite correction value will be explained with reference to FIGS. 9, 10, 11, 12, 13, and 14.

Figure 9:
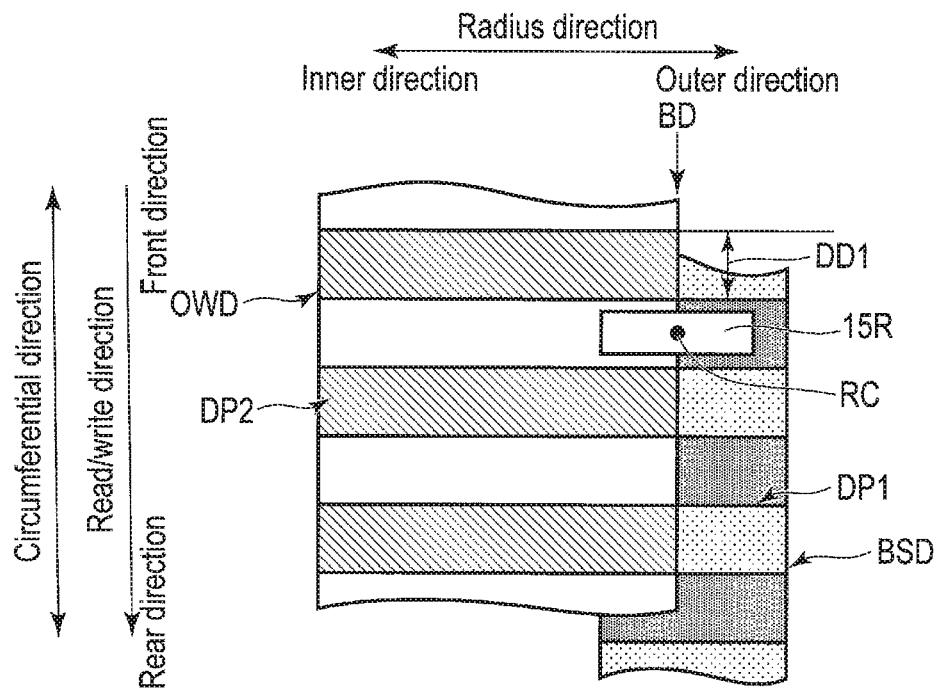
FIG. 9 is a diagram illustrating an example of the calculation process of the overwrite correction value of the first embodiment.

FIG. 9 is a diagram illustrating an example of a calculation process of an overwrite correction value of the present embodiment. FIG. 9 illustrates an example where the head 15 is positioned to the inner periphery area IR in which data written by the write head 15W1, for example, base data BSD and data written by the write head 15W2, for example, overwrite data OWD are shown. In FIG. 9, a data pattern DP1 of base data BSD and a data pattern DP2 of overwrite data OWD have the same or practically the same periodical patterns in the circumferential direction, for example. A width of the baes data BSD in the radius direction (hereinafter referred to as base data width) is less than a width of the overwrite data OWD in the radius direction (hereinafter referred to as overwrite data width). In FIG. 9, data patterns DP1 and DP2 are shifted from each other in the read/write direction by a distance DD1 corresponding to ½ phase (π). Furthermore, FIG. 9 illustrates read head 15R.

In the example of FIG. 9, the correction value calculator 610 positions the center RC of the read head 15R to a boundary position BD of the base data BSD and the overwrite data OWD, and reads the base data BSD and the overwrite data OWD. The correction value calculator 610 may calculate the overwrite correction value based on the distance DD1 corresponding to a shift between the data patterns DP1 and DP2.

Figure 10:
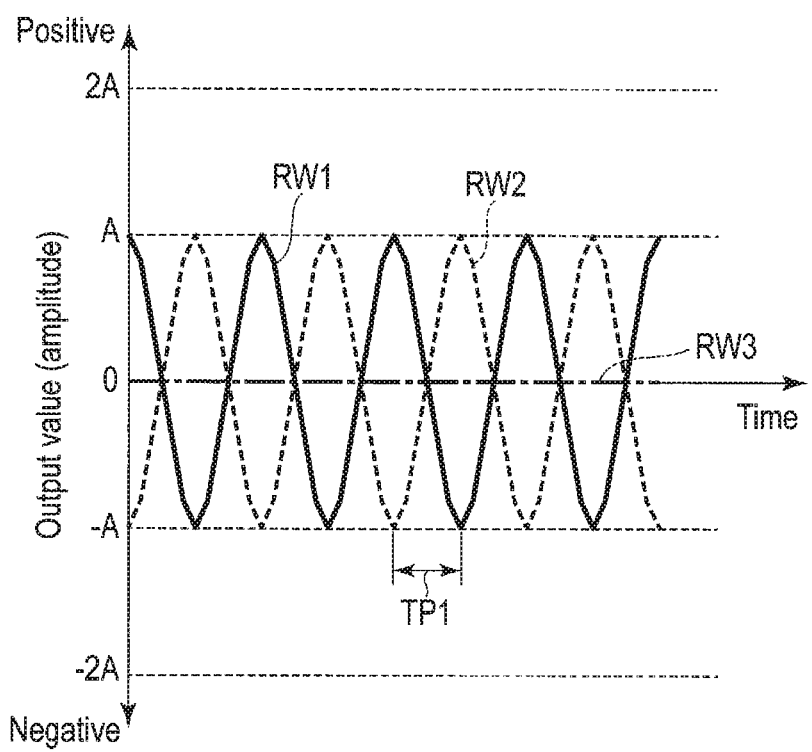
FIG. 10 is a diagram illustrating an example of a read waveform corresponding to base data written by the write head and a read waveform corresponding to overwrite data written by the write head shown in FIG. 9, and a waveform formed by overlapping the read waveforms.

FIG. 10 is a diagram illustrating an example of a read waveform RW1 corresponding to the base data BSD written by the write head 15W1 and a read waveform RW2 corresponding to the overwrite data OWD written by the write head 15W2 shown in FIG. 9, and a waveform RW3 which is formed by overlapping the read waveforms RW1 and RW2. In FIG. 10, the vertical axis indicates output values of the read waveforms (amplitude of each waveform). In the vertical axis of FIG. 10, a positive value increases toward the tip of the positive arrow, and a negative value decreases toward the tip of the negative arrow. In the vertical axis of FIG. 10, output value −2A, output value −A, point of origin (0), output value A, and output value 2A are shown, where −2A<−A<0<A<2A. The absolute value of −2A is the same as the absolute value of 2A, and the absolute value of −A is the same as the absolute value of A. In FIG. 10, the horizontal axis indicates a time. FIG. 10 indicates data written by the write head 15W1 of FIG. 9 in a certain track, for example, the read waveform RW1 read from the base data BSD by the read head 15R, and data written by the write head 15W2 of FIG. 9 in a certain track, for example, the read waveform RW2 read from the overwrite data OWD by the read head 15R. Furthermore, FIG. 10 indicates a waveform RW3 which is formed by overlapping the read waveforms RW1 and RW2. As in FIG. 10, if an overwrite process is executed without adjusting the overwrite timing while the data patterns DP1 and DP2 are shifted, the amplitude of waveform RW3 becomes 0. Thus, the overwrite correction value is calculated such that the absolute value of the maximum amplitude of the waveform formed by overlapping the read waveforms RW1 and RW2 becomes greater than amplitude A.

In the example of FIG. 10, the correction value calculator 610 calculates an overwrite correction value based on a time difference TP1 corresponding to a phase difference (n) between the read waveform RW1 of the data pattern DP1 of FIG. 9 and the read waveform RW2 of the data pattern DP2 of FIG. 9.

Figure 11:
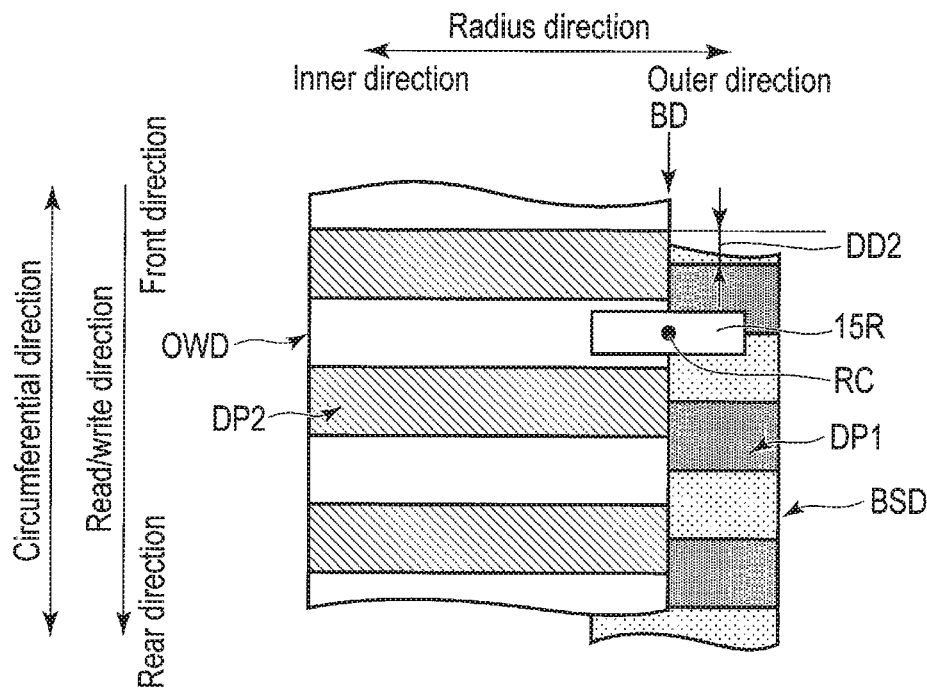
FIG. 11 is a diagram illustrating an example of a calculation process of an overwrite correction value of the first embodiment.

FIG. 11 is a diagram illustrating an example of a calculation process of an overwrite correction value of the present embodiment. FIG. 11 illustrates an example where the head 15 is positioned to the inner periphery area IR in which base data BSD are written by the write head 15W1 and overwrite data OWD are written by the write head 15W2. In FIG. 11, data pattern DP1 of the base data BSD and data pattern DP2 of the overwrite data OWD are shifted from each other in the read/write direction by a distance DD2 corresponding to ¼ phase (π/2).

In the example of FIG. 11, the correction value calculator 610 positions the center RC of the read head 15R to a boundary position BD of the base data BSD and the overwrite data OWD, and reads the base data BSD and the overwrite data OWD. The correction value calculator 610 may calculate the overwrite correction value based on the distance DD2 corresponding to a shift between the data patterns DP1 and DP2.

Figure 12:
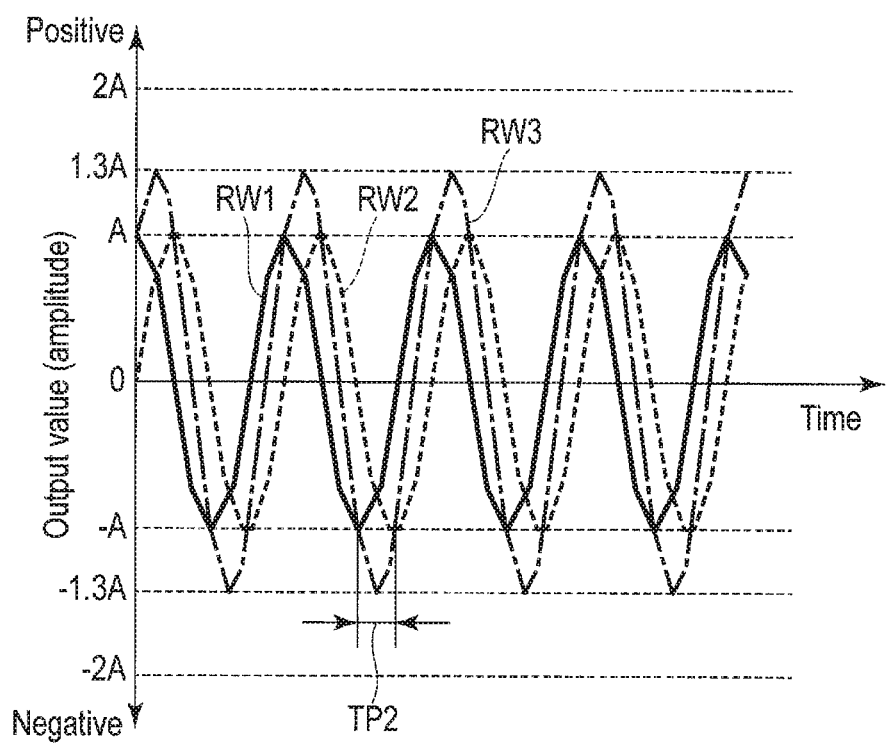
FIG. 12 is a diagram illustrating an example of a read waveform corresponding to base data written by the write head and a read waveform corresponding to overwrite data written by the write head shown in FIG. 11, and a waveform formed by overlapping the read waveforms.

FIG. 12 is a diagram illustrating an example of a read waveform RW1 corresponding to the base data BSD written by the write head 15W1 and a read waveform RW2 corresponding to the overwrite data OWD written by the write head 15W2 shown in FIG. 11, and a waveform RW3 which is formed by overlapping the read waveforms RW1 and RW2. In FIG. 12, the vertical axis indicates output values of the read waveforms (amplitude of each waveform). In the vertical axis of FIG. 12, a positive value increases toward the tip of the positive arrow, and a negative value decreases toward the tip of the negative arrow. In the vertical axis of FIG. 12, output value −2A, output value −1.3A, output value −A, point of origin (0), output value A, output value 1.3A, and output value 2A are shown, where −2A<−1.3A<−A<0<A<1.3A<2A. The absolute value of −1.3A is the same as the absolute value of 1.3A. In FIG. 12, the horizontal axis indicates a time. FIG. 12 indicates read waveform RW1 from reading by the read head 15R of the base data BSD written by the write head 15W1 of FIG. 11 in a certain track, and read waveform RW2 from reading by the read head 15R of the overwrite data OWD written by the write head 15W2 of FIG. 11 in a certain track. Furthermore, FIG. 12 indicates a waveform RW3 which is formed by overlapping the read waveforms RW1 and RW2. As in FIG. 12, if an overwrite process is executed without adjusting the overwrite timing while the data patterns DP1 and DP2 are shifted, the amplitude of waveform RW3 becomes 1.3A. Thus, the overwrite correction value is calculated such that the absolute value of the maximum amplitude of the waveform formed by overlapping the read waveforms RW1 and RW2 becomes greater than amplitude 1.3A. Note that, since the absolute value of the maximum amplitude of the waveform RW3 is greater than A, the overwrite correction value may not be calculated.

In the example of FIG. 12, the correction value calculator 610 calculates an overwrite correction value based on a time difference TP2 corresponding to a phase difference (π/2) between the read waveform RW1 of the data pattern DP1 of FIG. 11 and the read waveform RW2 of the data pattern DP2 of FIG. 11. Note that, since the absolute value of the maximum amplitude of the waveform RW3 is greater than A, the correction value calculator 610 may not calculate the overwrite correction value.

FIG. 13 is a diagram illustrating an example of a calculation process of an overwrite correction value of the present embodiment. FIG. 13 illustrates an example where the head 15 is positioned to the inner periphery area IR in which base data BSD are written by the write head 15W1 and overwrite data OWD are written by the write head 15W2. In FIG. 13, data pattern DP1 of the base data BSD and data pattern DP2 of the overwrite data OWD match with each other in the read/write direction. In other words, the data patterns DP1 and DP2 are not shifted in the read/write direction.

In the example of FIG. 13, the correction value calculator 610 positions the center RC of the read head 15R to a boundary position BD between the base data BSD and the overwrite data WD, and reads the base data BSD and the overwrite data OWD. Since the data patterns DP1 and DP2 do not match, the correction value calculator 610 does not calculate an overwrite correction value.

FIG. 14 is a diagram illustrating an example of a read waveform RW1 corresponding to the base data BSD written by the write head 15W1 and a read waveform RW2 corresponding to the overwrite data OWD written by the write head 15W2 shown in FIG. 13, and a waveform RW3 which is formed by overlapping the read waveforms RW1 and RW2. In FIG. 14, the vertical axis indicates output values of the read waveforms (amplitude of each waveform). In the vertical axis of FIG. 14, a positive value increases toward the tip of the positive arrow, and a negative value decreases toward the tip of the negative arrow. In FIG. 14, the horizontal axis indicates a time. FIG. 14 indicates read waveform RW1 from reading by the read head 15R of the base data BSD written by the write head 15W1 of FIG. 13 in a certain track, and read waveform RW2 from reading by the read head 15R of the overwrite data OWD written by the write head 15W2 of FIG. 13 in a certain track. Furthermore, FIG. 14 indicates a waveform RW3 which is formed by overlapping the read waveforms RW1 and RW2. As in FIG. 14, if an overwrite process is executed while the data patterns DP1 and DP2 match with each other, the amplitude of waveform RW3 becomes 2A. Since the data patterns DP1 and DP2 match as in FIG. 14, the overwrite correction value is not calculated.

In the example of FIG. 14, the correction value calculator 610 does not calculate the overwrite correction value since the read waveform RW1 of the data pattern DP1 of FIG. 13 and the read waveform RW2 of the data pattern DP2 match with each other.

Figure 15:
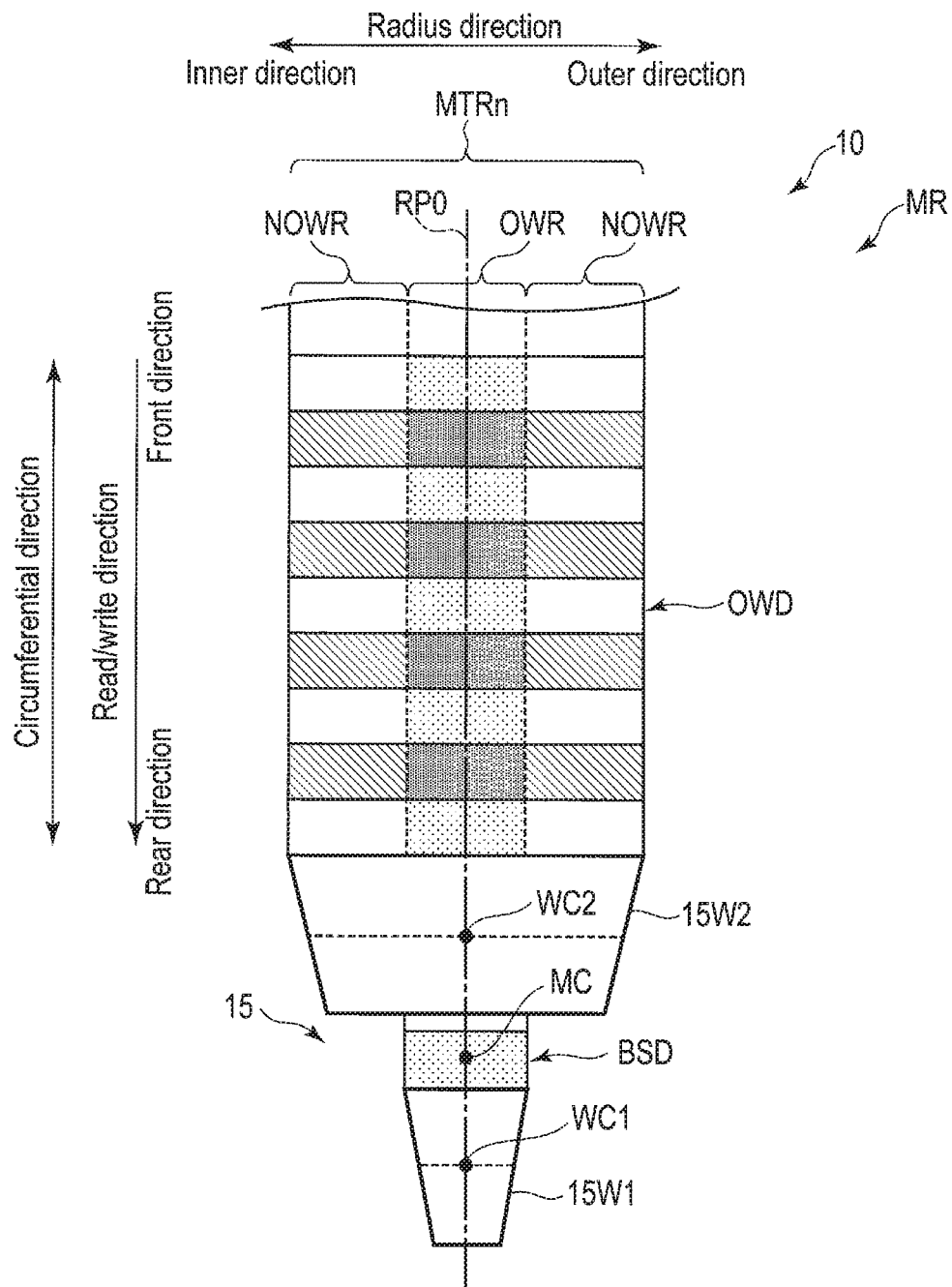
FIG. 15 is a diagram illustrating an example of an overwrite process when a head is positioned in a middle periphery area.

FIG. 15 illustrates an example of an overwrite process in a case where the head 15 is positioned in the middle periphery area MR. FIG. 15 indicates a track MTRn written by positioning the head 15 in the radius position RP0 of the middle periphery area MR. In the track MTRn, the overwrite data OWD are overwritten in the base data BSD. FIG. 15 illustrates a width of the base data BSD in the radius direction (hereinafter may be simply referred to as width of base data BSD) is less than a width of the overwrite data OWD in the radius direction (hereinafter may be simply referred to as overwrite data OWD). In FIG. 15, the width of the overwrite data OWD corresponds to the track width of the track MTRn. The track MTRn includes the overwrite area OWR and area other than the overwrite area OWR (hereinafter will be referred to as no-overwrite area) NOWR. The no-overwrite area NOWR corresponds to an area of the base data BSD to which the overwrite data are not written, and corresponds to, for example, an area to which the base data or the overwrite data OWD are written. In the track MTRn of FIG. 15, the overwrite area OWR is positioned in the center part in the radius direction, and the no-overwrite area NOWR is positioned, in the radius direction, in the inner direction and the outer direction of the overwrite area OWR.

In the example of FIG. 15, the write controller 620 positions, in the middle periphery area MR, the middle point MC in the radius, and writes the track MTRn. In the example of FIG. 15, the write controller 620 writes the base data BSD in the center of the track width of the track MTRn by the write head 15W1, and after the base data BSD are written by the write head 15W1, overwrites the overwrite data OWD by the write head 15W2 at an overwrite timing adjusted based on the overwrite correction value on the base data BSD, and writes the track MTRn.

FIG. 16 illustrates an example of a band area MBR written in the middle periphery area MR. FIG. 16 illustrates the band area MBR. The band area MBR includes a track MTR11, track MTR12, and track MTR13. The track MTR12 is overwritten on a part of the track MTR11. The track MTR13 is overwritten on a part of the track MTR12. The track MTR11 includes an overwrite area OWR11 and a no-overwrite area NOWR11. The track MRT12 includes an overwrite area OWR12 and a no-overwrite area NOWR12. The track MRT13 includes an overwrite area OWR13 and a no-overwrite area NOWR13.

In the example of FIG. 16, the write controller 620 overwrites, in the middle periphery area MR, the tracks MTR11, MTR12, and MTR13 one after another with the outer direction as the shingled magnetic recording direction while the head 15 is as in FIG. 15. In the example of FIG. 16, the write controller 620 overwrites, in the middle periphery area MR, the tracks MTR11, MTR12, and MTR13 while a part of the overwrite area OWR11, a part of the overwrite area OWR12, and a part of the overwrite area OWR13 are maintained as read tracks. Note that, in FIG. 16, the write controller 620 may overwrite the tracks MTR1, MTR12, and MTR13 with the inner direction as the shingled magnetic recording direction. The write controller 620 can overwrite the tracks MTR1*l*, MTR12, and MTR13 in the inner direction while a part of the overwrite area OWR11, a part of the overwrite area OWR12, and a part of the overwrite area OWR13 are maintained as read tracks as in a case where the tracks MTR11, MTR12, and MTR13 are overwritten in the outer direction.

FIG. 17 illustrates an example of an overwrite process in a case where the head 15 is positioned in the outer periphery area OR. FIG. 17 indicates a track OTRn written by positioning the head 15 in the radius position ORP of the outer periphery area OR. In FIG. 17, the head 15 is inclined to the outer direction at a certain skew angle. In FIG. 17, a width of the base data BSD is greater than a width of the overwrite data OWD. In FIG. 17, the width of the overwrite data OWD corresponds to the track width of the track OTRn. The track OTRn includes an overwrite area OWR and a no-overwrite area NOWR. In the track OTRn of FIG. 17, the overwrite area OWR is positioned in the end of the inner direction in the radius direction, and the no-overwrite area NOWR is positioned, in the radius direction, in the inner direction of the overwrite area OWR.

In the example of FIG. 17, the write controller 620 positions, in the outer periphery area OR, the middle point MC in the radius, and writes the track OTRn. In the example of FIG. 17, the write controller 620 writes the base data BSD in an end of the inner direction of the track width of the track OTRn by the write head 15W1, and after the base data BSD are written by the write head 15W1, overwrites the overwrite data OWD by the write head 15W2 at an overwrite timing adjusted based on the overwrite correction value on the base data BSD, and writes the track OTRn.

Figure 18:
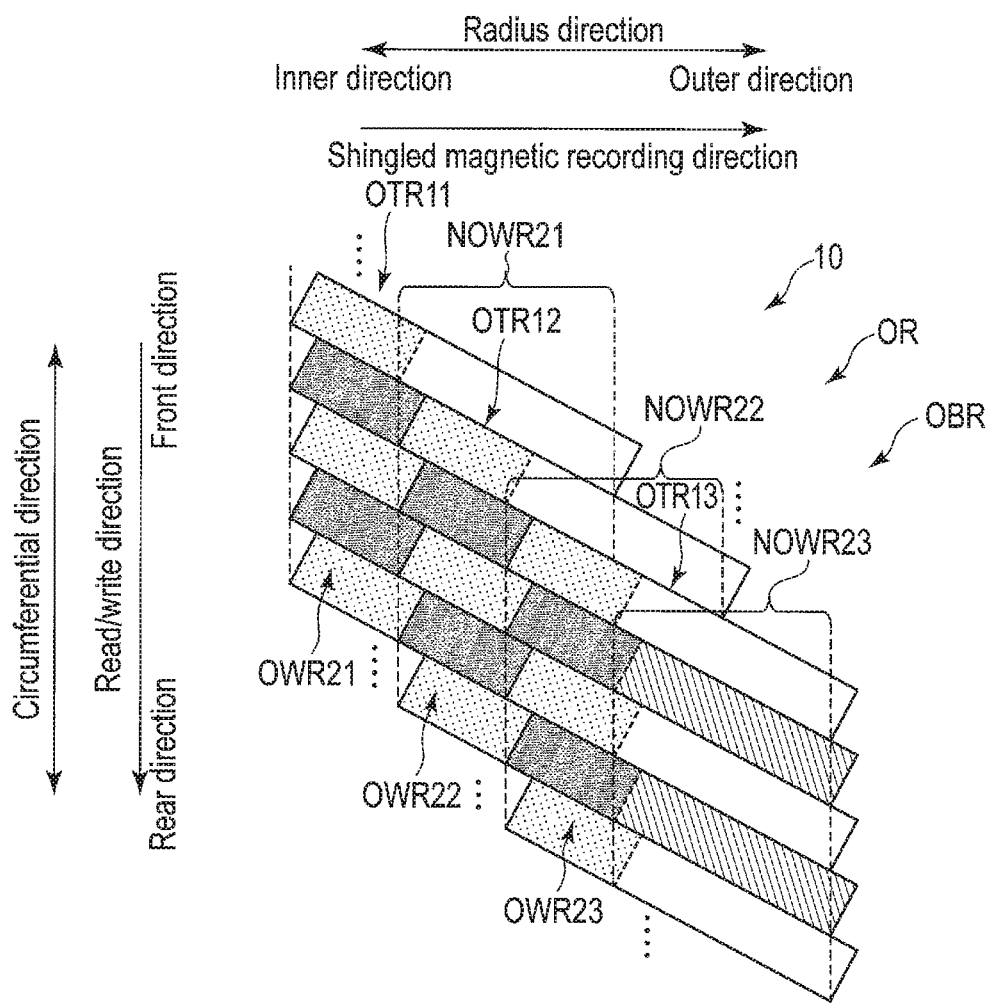
FIG. 18 is a diagram illustrating an example of a band area written in the outer periphery area.

FIG. 18 illustrates an example of a band area OBR written in the outer periphery area OR. FIG. 18 illustrates the band area OBR. The band area OBR includes a track OTR11, track OTR12, and track OTR13. The track OTR12 is overwritten on a part of the track OTR11. The track OTR13 is overwritten on a part of the track OTR12. The track OTR11 includes an overwrite area OWR21 and a no-overwrite area NOWR21. The track OTR12 includes an overwrite area OWR22 and a no-overwrite area NOWR22. The track OTR13 includes an overwrite area OWR23 and a no-overwrite area NOWR23.

In the example of FIG. 18, the write controller 620 overwrites, in the outer periphery area OR, the tracks OTR11, OTR12, and OTR13 one after another with the outer direction as the shingled magnetic recording direction while the head 15 is as in FIG. 17. In the example of FIG. 18, the write controller 620 overwrites, in the outer periphery area OR, the tracks OTR11, OTR12, and OTR13 while the overwrite area OWR21, overwrite area OWR22, and overwrite area OWR23 are maintained as read tracks. Note that, in FIG. 18, the write controller 620 may overwrite the tracks OTR11, OTR12, and OTR13 with the inner direction as the shingled magnetic recording direction. For example, if the write controller 620 overwrites, in the outer periphery area OR, the tracks OTR11, OTR12, and OTR13 in the inner direction, the write controller 620 may overwrite the track OTR12 on the overwrite area OER21 and overwrite the track OTR13 on the overwrite area OER22.

Figure 19:
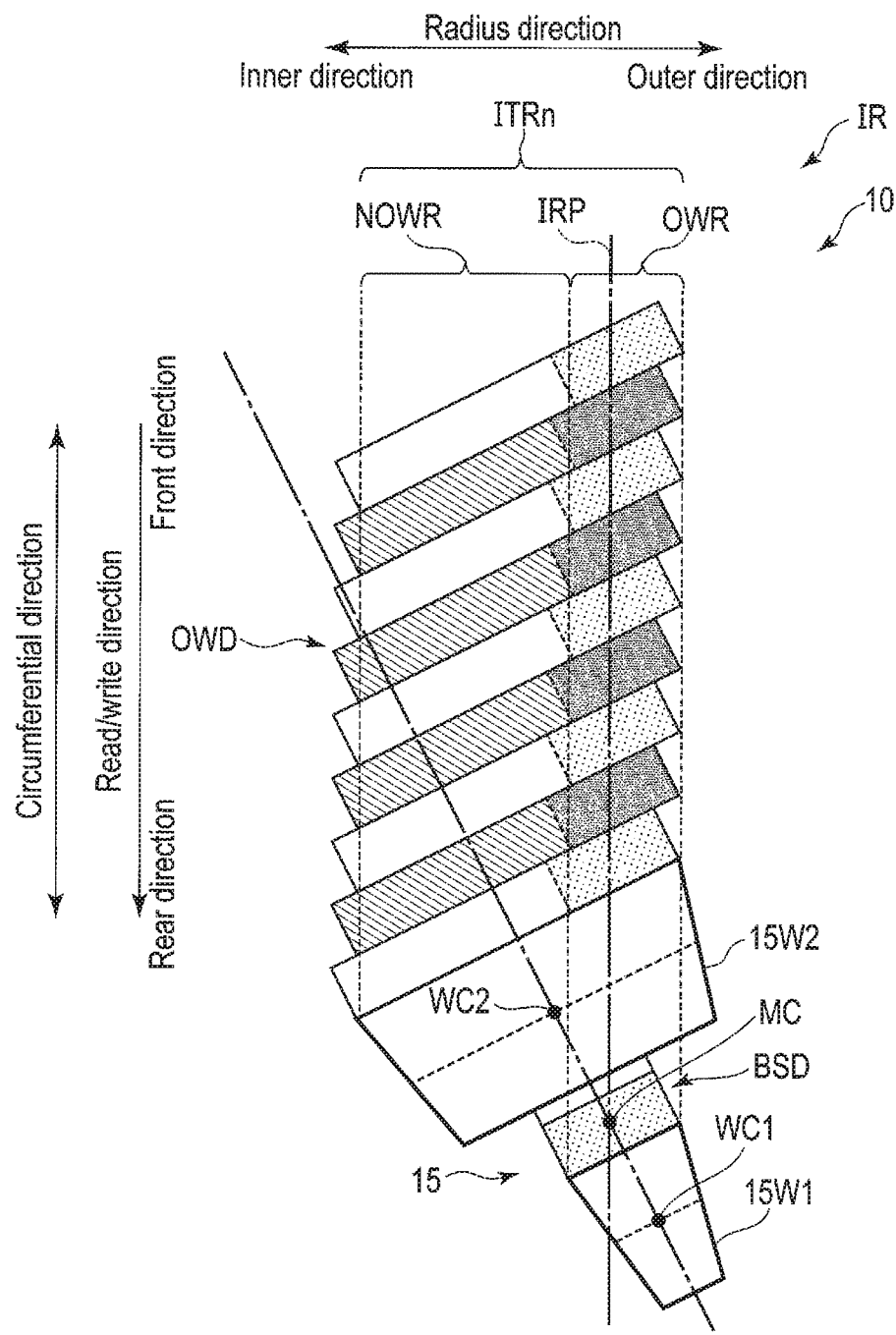
FIG. 19 is a diagram illustrating an example of an overwrite process in a case where the head is positioned in an inner periphery area.

FIG. 19 illustrates an example of an overwrite process in a case where the head 15 is positioned in the inner periphery area IR. FIG. 19 indicates a track ITRn written by positioning the head 15 in the radius position IRP of the inner periphery area IR. In FIG. 19, the head 15 is inclined to the inner direction at a certain skew angle. The track ITRn includes an overwrite area OWR and a non-overwrite area NOWR. In the track ITRn of FIG. 19, the overwrite area OWR is positioned in the end of the outer direction in the radius direction, and the no-overwrite area NOWR is positioned, in the radius direction, in the inner direction of the overwrite area OWR.

In the example of FIG. 19, the write controller 620 positions, in the inner periphery area IR, the middle point MC in the radius position IRP, and writes the track ITRn. In the example of FIG. 19, the write controller 620 writes the base data BSD in an end of the outer direction of the track width of the track ITRn by the write head 15W1, and after the base data BSD are written by the write head 15W1, overwrites the overwrite data OWD by the write head 15W2 at an overwrite timing adjusted based on the overwrite correction value on the base data BSD, and writes the track ITRn.

Figure 20:
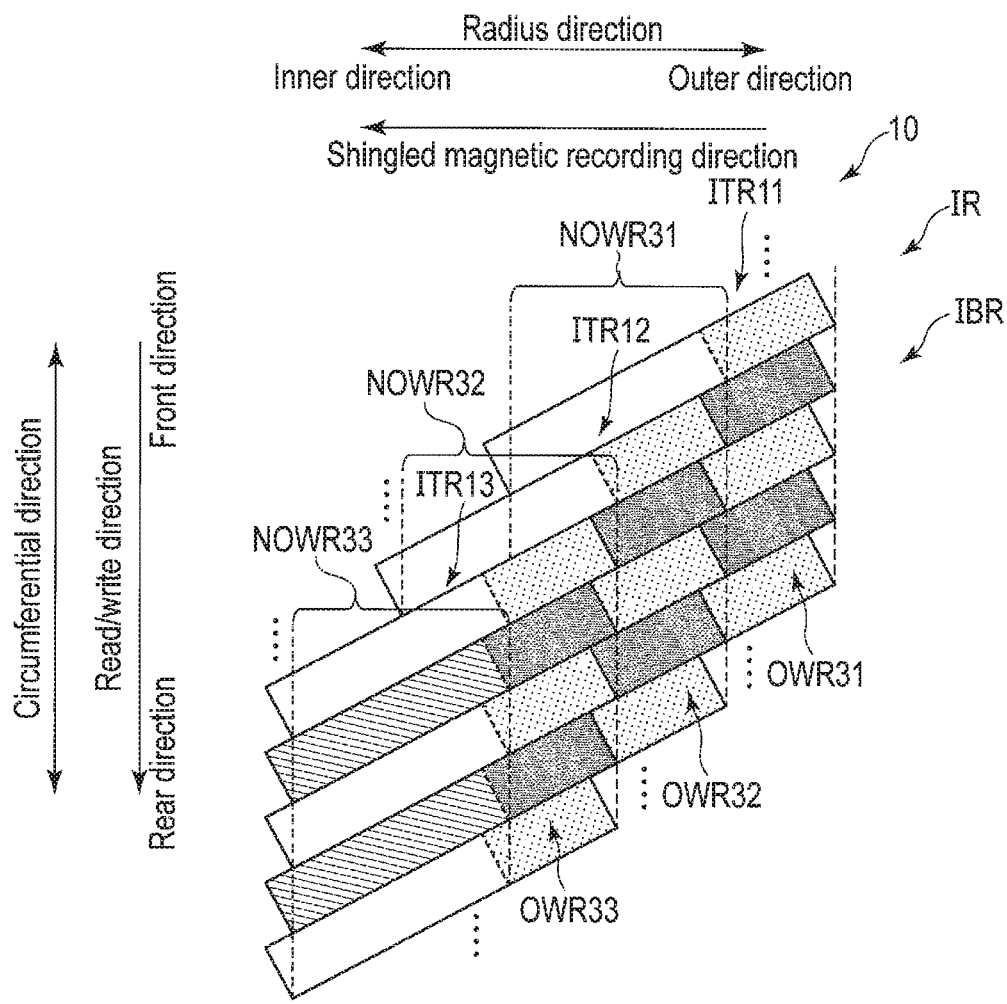
FIG. 20 is a diagram illustrating an example of the band area written in the inner periphery area.

FIG. 20 illustrates an example of a band area IBR written in the inner periphery area IR. FIG. 20 illustrates the band area IBR. The band area IBR includes a track ITR11, track ITR12, and track ITR13. The track ITR12 is overwritten on a part of the track ITR11. The track ITR13 is overwritten on a part of the track ITR12. The track ITR11 includes an overwrite area OWR31 and a no-overwrite area NOWR31. The track ITR12 includes an overwrite area OWR32 and a no-overwrite area NOWR32. The track ITR13 includes an overwrite area OWR33 and a no-overwrite area NOWR33.

In the example of FIG. 20, the write controller 620 overwrites, in the inner periphery area IR, the tracks ITR11, ITR12, and ITR13 one after another with the inner direction as the shingled magnetic recording direction while the head 15 is as in FIG. 19. In the example of FIG. 20, the write controller 620 overwrites, in the inner periphery area IR, the tracks ITR11, ITR12, and ITR13 while the overwrite area OWR31, overwrite area OWR32, and overwrite area OWR33 are maintained as read tracks. Note that, in FIG. 19, the write controller 620 may overwrite the tracks ITR11, ITR12, and ITR13 with the outer direction as the shingled magnetic recording direction. For example, if the write controller 620 overwrites, in the inner periphery area IR, the tracks ITR11, ITR12, and ITR13 in the outer direction, the write controller 620 may overwrite the track ITR12 on the overwrite area OER31 and overwrite the track ITR13 on the overwrite area OER32.

Figure 21:
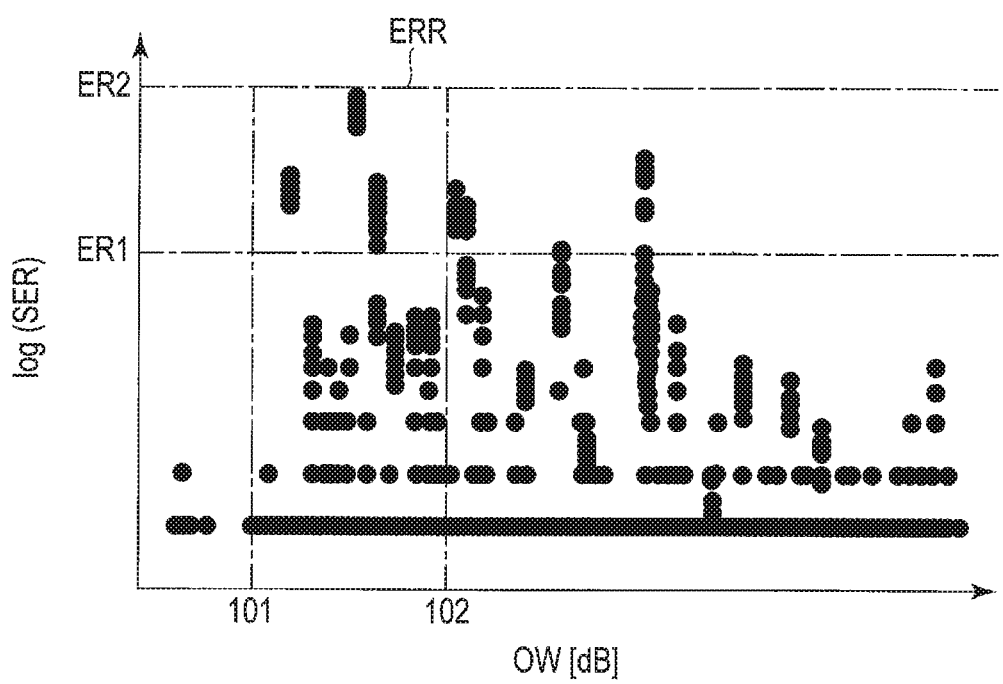
FIG. 21 is a diagram illustrating a relationship between an overwrite and a logarithmic value of a sector error rate when overwrite data are written with a frequency of a certain recording magnetic field on base data written with a frequency of a certain recording magnetic field.

FIG. 21 is a diagram illustrating a relationship between an overwrite (OW) and a logarithmic value of a sector error rate (SER) when overwrite data are written with a frequency of a certain recording magnetic field on base data written with a frequency of a certain recording magnetic field. In FIG. 21, the horizontal axis indicates an overwrite characteristic (hereinafter may be simply referred to as Over Write (OW)) [Decibel:dB], and the vertical axis indicates a logarithmic value of sector error rate (hereinafter may be referred to as SER). OW corresponds to, in a case where, on certain data written in a certain recording area, for example, zone, track, or sector (hereinafter may be referred to as former data), other data (hereinafter may be referred to as latter data) are overwritten, an attenuation rate of the former data. SER is calculated by, when a certain area of the disk 10 in which data are written, for example, at least one sector of a certain track is read, dividing the number of sectors which indicate an error by the number of sectors read. It is regarded that, when SER of the data written in a certain area of the disk 10 becomes lower, the recording quality of the data written in the area is higher, and when SER of the data written in the area is higher, the recording quality of the data written in the area is lower. In the horizontal axis of FIG. 21, OW increases toward the tip of the arrow. The horizontal axis of FIG. 21 indicates OWs 101 and 102. OW 102 is greater than OW 101. In the vertical axis of FIG. 21, the logarithmic value of SER increases toward the tip of the arrow. The vertical axis of FIG. 21 indicates logarithmic values ER1 and ER2 of SER. The logarithmic value ER2 of SER is greater than the logarithmic value ER1 of SER.

In the example of FIG. 21, overwrite data are written with a frequency of a certain recording magnetic field on base data written with a frequency of a certain recording magnetic field. In that case, as in FIG. 21, in an area ERR surrounded by a range from OW 101 to OW 102 and a range from the logarithmic value ER1 of SER and the logarithmic value ER2 of SER, the maximum value of the logarithmic value SER corresponds to the logarithmic Value ER2 of SER.

Figure 22:
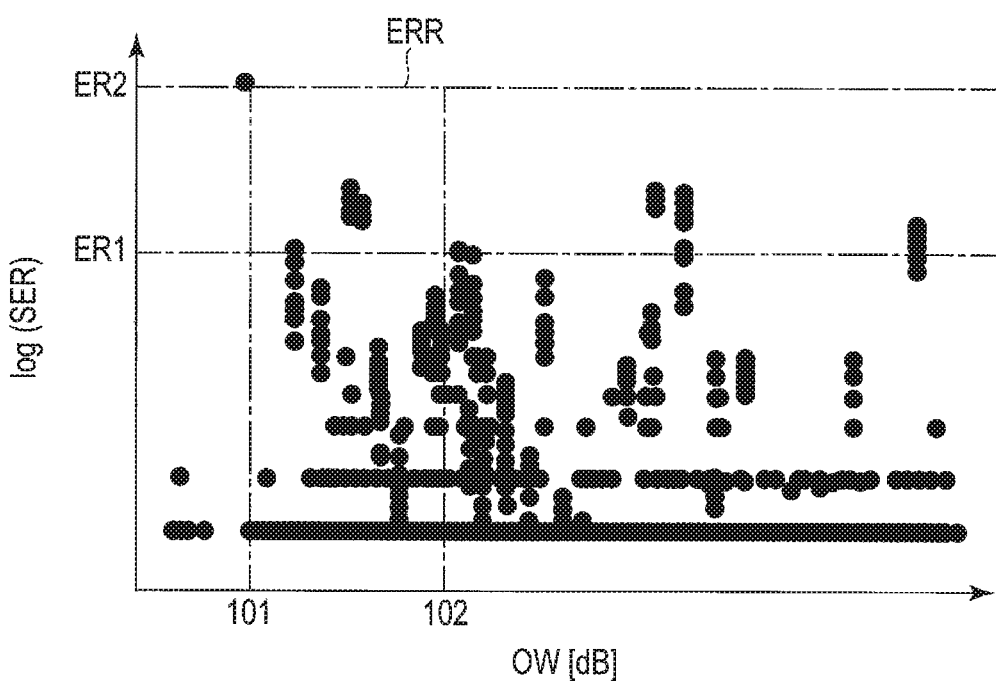
FIG. 22 is a diagram illustrating a relationship between an overwrite and a logarithmic value of a sector error rate when overwrite data are written on base data written with a frequency of lower recording magnetic field than that in the writing of the overwrite data.

FIG. 22 is a diagram illustrating a relationship between an overwrite (OW) and a logarithmic value of a sector error rate (SER) when overwrite data are written on base data written with a frequency of lower recording magnetic field than that used in writing the overwrite data. In FIG. 22, the horizontal axis indicates OW [Decibel:dB], and the vertical axis indicates a logarithmic value of SER. In the horizontal axis of FIG. 22, OW increases toward the tip of the arrow. The horizontal axis of FIG. 22 indicates OWs 101 and 102. In the vertical axis of FIG. 22, the logarithmic value of SER increases toward the tip of the arrow. The vertical axis of FIG. 22 indicates logarithmic values ER1 and ER2 of SER.

In the example of FIG. 22, the overwrite data are written on the base data written with a frequency of lower recording magnetic field than that used in the writing of the overwrite data. In that case, the maximum value of the logarithmic value of SER in the area ERR of FIG. 22 is lower than the maximum value of the logarithmic value of SER in the area ERR of FIG. 21. That is, between at least OW 101 and OW 102, when the overwrite data are written on the base data written with a frequency of lower recording magnetic field than that used in the writing of the overwrite data, the recording quality will be improved as compared to the example of FIG. 21 where the overwrite data are overwritten with a frequency of a certain recording magnetic field on the base data written with a frequency of a certain recording magnetic field.

FIG. 23 is a flowchart of an example of a write processing method of the present embodiment.

The system controller 130 determines whether or not a current overwrite timing is adjusted when an overwrite process is executed in a radius area (B2301). If it is determined that the current overwrite timing is adjusted (YES in B2301), the system controller 130 adjusts the current overwrite timing based on the overwrite correction value (B2302), and overwrites overwrite data on base data (B2303). For example, the system controller 130 adjusts the current overwrite timing to be delayed from a base timing by an overwrite correction value, and overwrites the overwrite data on the base data at the overwrite timing delayed by the overwrite correction value. The system controller 130 sets a shingled magnetic recording direction based on a radius position (or skew angle), performs the shingled magnetic recording of tracks each overwritten in the set shingled magnetic recording direction (B2304), and ends the process. For example, the system controller 130 sets a direction in which multiple tracks can be overwritten such that the overwrite areas can be kept as read tracks in a radius direction based on the radius position (or skew angle) as the shingled magnetic recording direction, and performs the shingled magnetic recording of the tracks each overwritten in the set shingled magnetic recording direction. If it is not determined that the overwrite timing is adjusted (NO in B2301), the system controller 130 overwrites the overwrite data on the base data (B2303), sets the shingled magnetic recording direction based on the radius position (or skew angle) (B2304), and ends the process. For example, the system controller 130 overwrites the overwrite data on the base data at the current overwrite timing.

According to the present embodiment, the magnetic disk device 1 includes a plurality of write heads 15W on one head 15, for example, write heads 15W1 and 15W2. For example, the write head 15W1 is less than the write head 15W2. The magnetic disk device 1 determines whether or not a current overwrite timing is adjusted. If it is determined that the current overwrite timing is adjusted, the magnetic disk device 1 adjusts the current overwrite timing based on the overwrite correction value. The magnetic disk device 1 writes base data in a radius area by the write head 15W1, and after writing the base data by the write head 15W1, overwrites overwrite data on the base data by the write head 15W2 at the overwrite timing adjusted based on the overwrite correction value corresponding to the radius area. The magnetic disk device 1 sets a shingled magnetic recording direction based on the radius position, and performs shingled magnetic recording of tracks each overwritten in the set shingled magnetic recording direction. By writing data in the disk 10 as above, the magnetic disk device 1 can improve the recording quality of data written in the disk 10. Thus, the magnetic disk device 1 can increase the credibility of data.

Now, magnetic disk devices of variations will be explained. In variations, same components in the aforementioned embodiment will be referred to by the same reference numbers, and the detailed description thereof will be omitted.

(Variation 1)

In a magnetic disk device 1 of variation 1, the structure of write heads 15W is different from that of the magnetic disk device 1 of the first embodiment.

Figure 24:
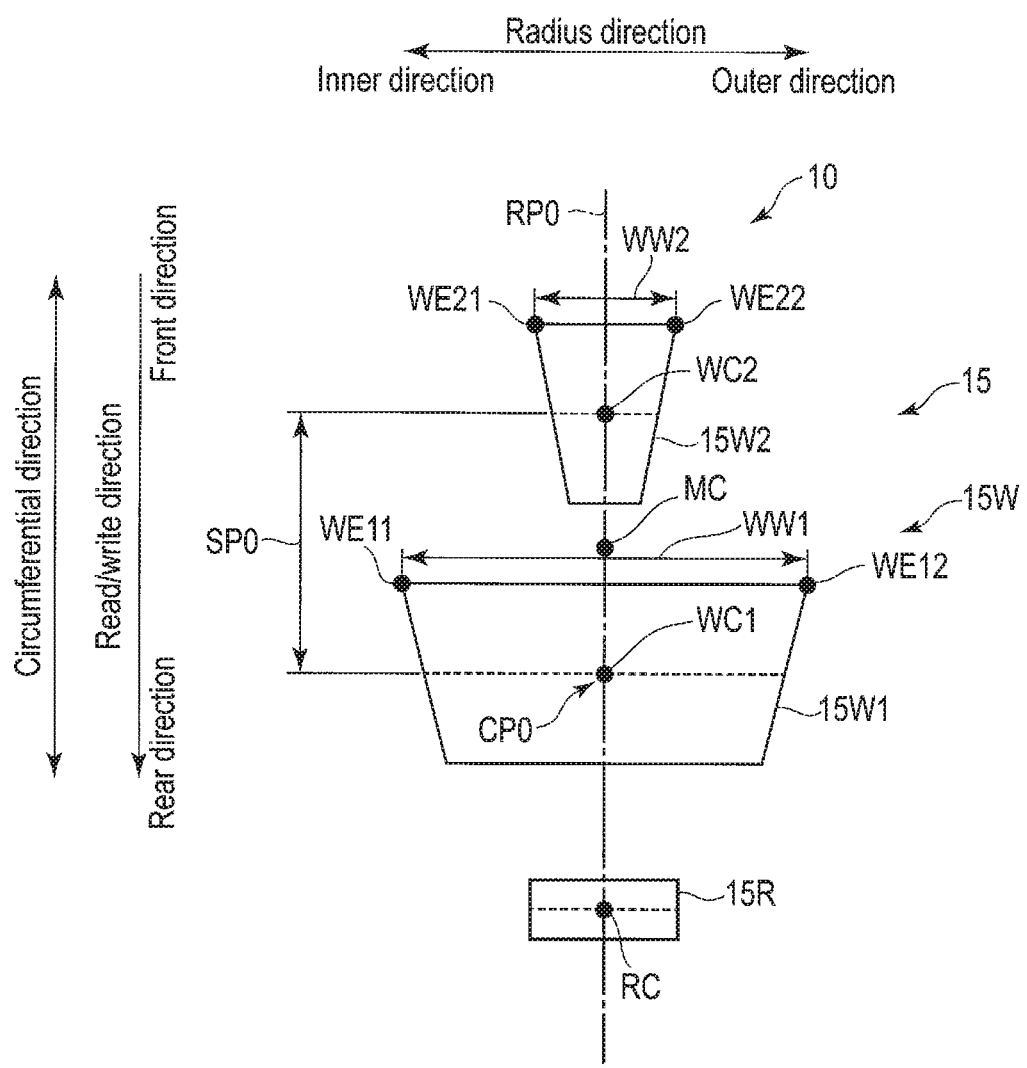
FIG. 24 is a plan view schematically illustrating an example of geometrical arrangement of two write heads and a read head of variation 1.

FIG. 24 is a plan view schematically illustrating an example of geometrical arrangement of two write heads 15W1 and 15W2 of variation 1. FIG. 24 only illustrates components necessary for the explanation. FIG. 24 illustrates a write head 15W1, write head 15W2, and read head 15R.

In the example of FIG. 24, a width WW2 of the write head 15W2 is less than a width WW1 of the write head 15W1. In other words, the write head 15W2 is less than the write head 15W1.

Figure 25:
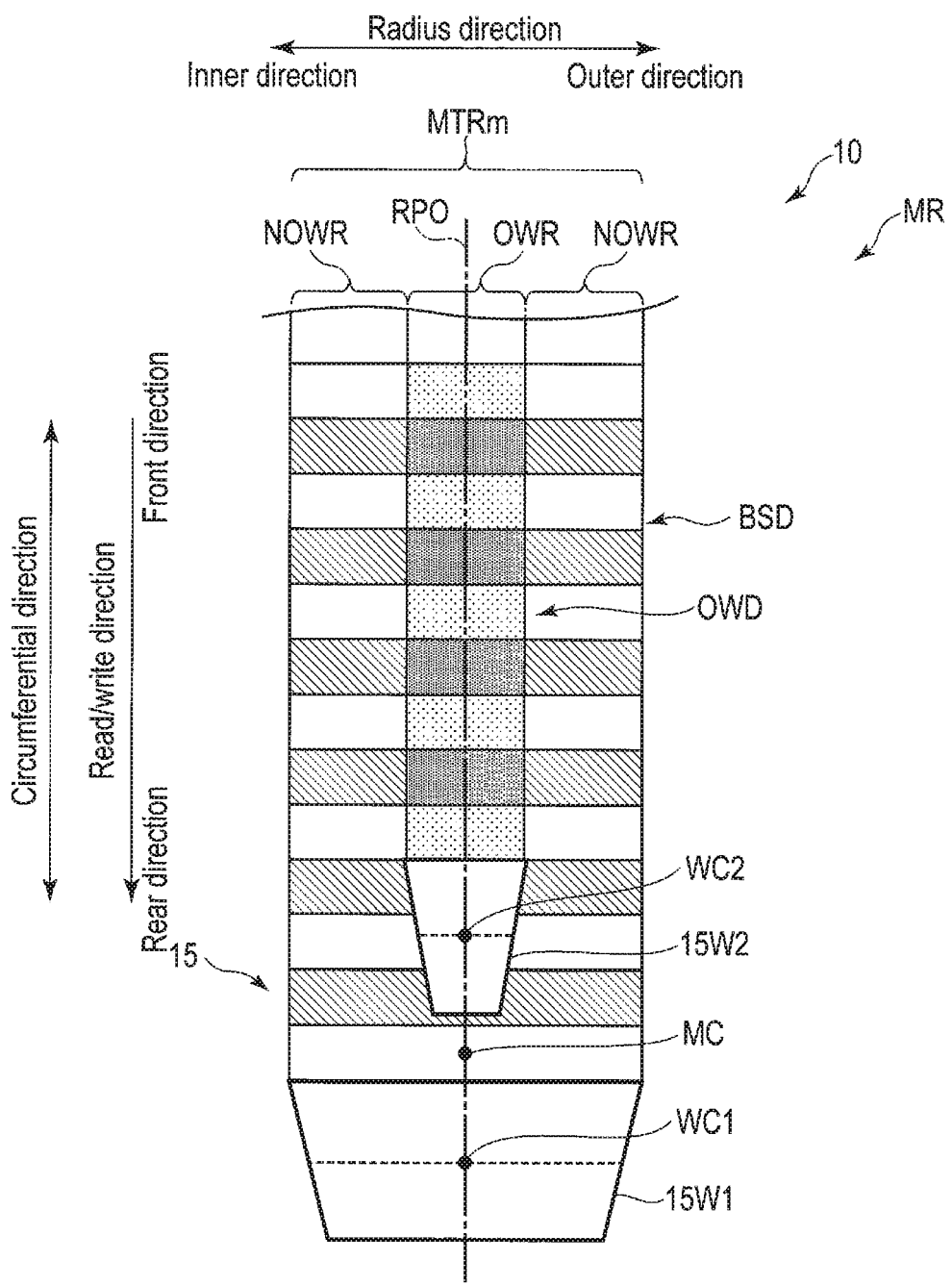
FIG. 25 is a diagram illustrating an example of an overwrite process when a head is positioned in a middle periphery area.

FIG. 25 illustrates an example of an overwrite process in a case where the head 15 is positioned in the middle periphery area MR. FIG. 25 indicates a track MTRm written by positioning the head 15 in the radius position RP0 of the middle periphery area MR. In the track MTRm, the overwrite data OWD are overwritten in the base data BSD. FIG. 25 illustrates a width of the base data BSD is greater than a width of the overwrite data OWD. In FIG. 25, the width of the base data BSD corresponds to the track width of the track MTRm. The track MTRm includes the overwrite area OWR and a no-overwrite area NOWR. In the track MTRm of FIG. 25, the overwrite area OWR is positioned in the center part in the radius direction, and the no-overwrite area NOWR is positioned, in the radius direction, in the inner direction and the outer direction of the overwrite area OWR.

In the example of FIG. 25, the write controller 620 positions, in the middle periphery area MR, the middle point MC in the radius position RP0, and writes the track MTRm. In the example of FIG. 25, the write controller 620 writes the base data BSD by the write head 15W1, and after the base data BSD are written by the write head 15W1, overwrites the overwrite data OWD by the write head 15W2 at an overwrite timing adjusted based on the overwrite correction value on the base data BSD in the center of the width of the base data BSD, and writes the track MTRm. For example, the write controller 620 executes shingled magnetic recording in the middle periphery area MR as in FIG. 16.

FIG. 26 illustrates an example of an overwrite process in a case where the head 15 is positioned in the outer periphery area OR. FIG. 26 indicates a track OTRm written by positioning the head 15 in the radius position ORP of the outer periphery area OR. In FIG. 26, the head 15 is inclined to the outer direction at a certain skew angle. In the track OTRm, overwrite data OWD are overwritten on the base data BSD. In FIG. 26, a width of the base data BSD is greater than a width of the overwrite data OWD. In FIG. 26, the width of the base data BSD corresponds to the track width of the track OTRm. The track OTRm includes an overwrite area OWR and a no-overwrite area NOWR. In the track OTRm of FIG. 26, the overwrite area OWR is positioned in the end of the outer direction in the radius direction, and the no-overwrite area NOWR is positioned, in the radius direction, in the inner direction of the overwrite area OWR.

In the example of FIG. 26, the write controller 620 positions, in the outer periphery area OR, the middle point MC in the radius, and writes the track OTRm. In the example of FIG. 26, the write controller 620 writes the base data BSD by the write head 15W1, and after the base data BSD are written by the write head 15W1, overwrites the overwrite data OWD by the write head 15W2 at an overwrite timing adjusted based on the overwrite correction value in an end of the outer direction of the base data BSD, and writes the track OTRm.

Figure 27:
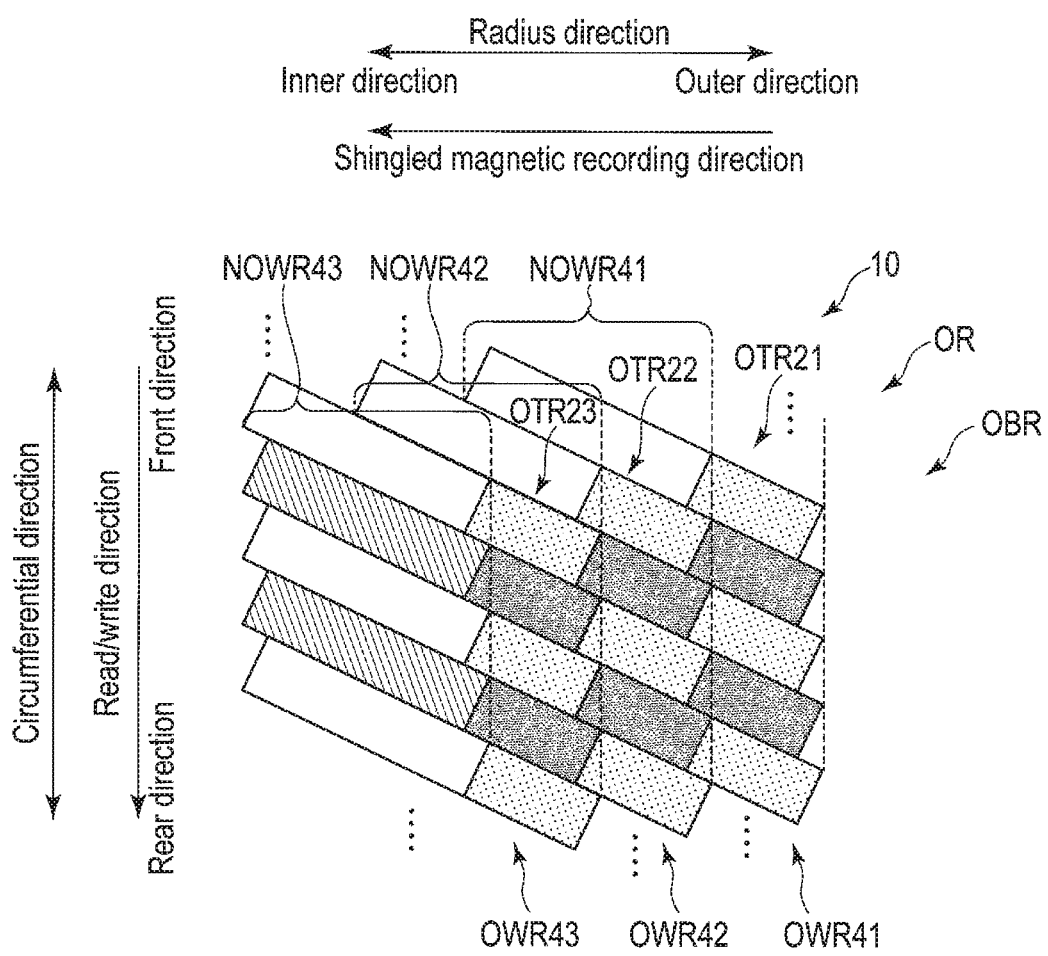
FIG. 27 is a diagram illustrating an example of a band area written in an outer periphery area.

FIG. 27 illustrates an example of a band area OBR written in the outer periphery area OR. FIG. 27 illustrates the band area OBR. The band area OBR includes a track OTR21, track OTR22, and track OTR23. The track OTR22 is overwritten on a part of the track OTR21. The track OTR23 is overwritten on a part of the track OTR22. The track OTR21 includes an overwrite area OWR41 and a no-overwrite area NOWR41. The track OTR22 includes an overwrite area OWR42 and a no-overwrite area NOWR42. The track OTR23 includes an overwrite area OWR43 and a no-overwrite area NOWR43.

In the example of FIG. 27, the write controller 620 overwrites, in the outer periphery area OR, the tracks OTR21, OTR22, and OTR23 one after another with the inner direction as the shingled magnetic recording direction while the head 15 is as in FIG. 26. In the example of FIG. 27, the write controller 620 overwrites, in the outer periphery area OR, the tracks OTR21, OTR22, and OTR23 while the overwrite area OWR41, overwrite area OWR42, and overwrite area OWR43 are maintained as read tracks. Note that, in FIG. 27, the write controller 620 may overwrite the tracks OTR21, OTR22, and OTR23 with the outer direction as the shingled magnetic recording direction. For example, if the write controller 620 overwrites, in the outer periphery area OR, the tracks OTR21, OTR22, and OTR23 in the inner direction, the write controller 620 may overwrite the track OTR22 on the overwrite area OER41 and overwrite the track OTR23 on the overwrite area OER42.

FIG. 28 illustrates an example of an overwrite process in a case where the head 15 is positioned in the inner periphery area IR. FIG. 28 indicates a track ITRm written by positioning the head 15 in the radius position IRP of the inner periphery area IR. In FIG. 28, the head 15 is inclined to the inner direction at a certain skew angle. In the track ITRm, overwrite data OWD are written on base data BSD. In FIG. 28, a width of the base data BSD corresponds to the track width of the track ITRm. The track ITRm includes the overwrite area OWR and the no-overwrite area NOWR. In the track ITRm of FIG. 28, the overwrite area OWR is positioned in the end of the outer direction in the radius direction, and the no-overwrite area NOWR is positioned, in the radius direction, in the inner direction of the overwrite area OWR.

In the example of FIG. 28, the write controller 620 positions, in the inner periphery area IR, the middle point MC in the radius position IRP, and writes the track ITRm. In the example of FIG. 28, the write controller 620 writes the base data BSD by the write head 15W1, and after the base data BSD are written by the write head 15W1, overwrites the overwrite data OWD by the write head 15W2 at an overwrite timing adjusted based on the overwrite correction value in an end of the inner direction of the width of the base data BSD, and writes the track ITRm.

FIG. 29 illustrates an example of a band area IBR written in the inner periphery area IR. FIG. 29 illustrates the band area IBR. The band area IBR includes a track ITR21, track ITR22, and track ITR23. The track ITR22 is overwritten on a part of the track ITR21. The track ITR23 is overwritten on a part of the track ITR22. The track ITR21 includes an overwrite area OWR51 and a no-overwrite area NOWR51. The track ITR22 includes an overwrite area OWR52 and a no-overwrite area NOWR52. The track ITR23 includes an overwrite area OWR53 and a no-overwrite area NOWR53.

In the example of FIG. 29, the write controller 620 overwrites, in the inner periphery area IR, the tracks ITR21, ITR22, and ITR23 one after another with the outer direction as the shingled magnetic recording direction while the head 15 is as in FIG. 28. In the example of FIG. 29, the write controller 620 overwrites, in the inner periphery area IR, the tracks ITR21, ITR22, and ITR23 while the overwrite area OWR51, overwrite area OWR52, and overwrite area OWR53 are maintained as read tracks. Note that, in FIG. 29, the write controller 620 may overwrite the tracks ITR21, ITR22, and ITR23 with the outer direction as the shingled magnetic recording direction. For example, if the write controller 620 overwrites, in the inner periphery area IR, the tracks ITR21, ITR22, and ITR23 in the inner direction, the write controller 620 may overwrite the track ITR22 on the overwrite area OER51 and overwrite the track ITR23 on the overwrite area OER52.

According to variation 1, the magnetic disk device 1 includes a plurality of write heads 15W on one head 15, for example, write heads 15W1 and 15W2. For example, the write head 15W1 is greater than the write head 15W2. The magnetic disk device 1 writes base data in a radius area by the write head 15W1, and after writing the base data by the write head 15W1, overwrites overwrite data on the base data by the write head 15W2 at the overwrite timing adjusted based on the overwrite correction value corresponding to the radius area. The magnetic disk device 1 sets a shingled magnetic recording direction based on the radius position, and performs shingled magnetic recording of tracks each overwritten in the set shingled magnetic recording direction. Thus, the magnetic disk device 1 can increase the credibility of data.

(Variation 2)

In a magnetic disk device 1 of variation 2, data are written in an ordinary write format which is not a shingled magnetic recording format, and in this respect, it is different from the magnetic disk device 1 of the aforementioned embodiment and variation 1.

FIG. 30 is a block diagram illustrating the structure of the magnetic disk device 1 of variation 2.

To a disk 10, in the area to which data can be written, a user data area 10a which can be used by a user, and a system area 10b to which data necessary for the system management are written are allocated. The user data area 10a is divided into an inner periphery area IR positioned in an inner direction, outer periphery area OR positioned in an outer direction, and middle periphery area MR positioned between the inner periphery area IR and the outer periphery area OR as in the shingled magnetic recording area 10s of FIG. 2.

FIG. 31 is a diagram illustrating an example of tracks MTR11, MTR12, and MTR13 written in the middle periphery area MR. In FIG. 31, the tracks MTR11, MTR12, and MTR13 are arranged toward the outer direction in this order at intervals.

In the example of FIG. 31, the write controller 620 writes, in the middle periphery area MR, the tracks MTR11, MTR12, and MTR13 in the radius direction at intervals as in FIG. 15.

FIG. 32 is a diagram illustrating an example of tracks OTR11, OTR12, and OTR13 written in the outer periphery area OR. In FIG. 32, the tracks OTR11, OTR12, and OTR13 are arranged toward the outer direction in this order at intervals.

In the example of FIG. 32, the write controller 620 writes, in the outer periphery area OR, the tracks OTR11, OTR12, and OTR13 in the radius direction at intervals as in FIG. 17.

FIG. 33 is a diagram illustrating an example of tracks ITR11, ITR12, and ITR13 written in the inner periphery area IR. In FIG. 33, the tracks ITR11, ITR12, and ITR13 are arranged toward the inner direction in this order at intervals.

In the example of FIG. 33, the write controller 620 writes, in the inner periphery area IR, the tracks ITR11, ITR12, and ITR13 in the radius direction at intervals as in FIG. 19.

Figure 34:
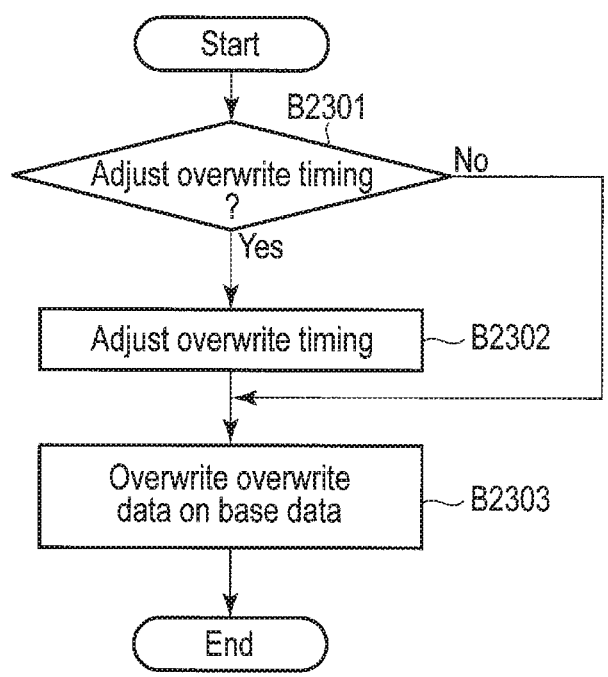
FIG. 34 is a flowchart of an example of a write processing method of variation 2.

FIG. 34 is a flowchart of an example of a write processing method of variation 2.

A system controller 130 determines whether or not an overwrite timing is adjusted if an overwrite process is executed in a radius area (B2301). If it is determined that the overwrite timing is adjusted (YES in B2301), the system controller 130 adjusts an overwrite timing based on an overwrite correction value (B2302), overwrites overwrite data on base data (B2303), and ends the process. If it is not determined that the overwrite timing is adjusted (NO in B2301), the system controller 130 overwrites the overwrite data on the base data (B2303), and ends the process.

According to variation 2, the magnetic disk device 1 writes base data in a radius area by a write head 15W1, and after the base data are written by the write head 15W1, overwrites overwrite data on the base data by the write head 15W2 at an overwrite timing adjusted based on an overwrite correction value corresponding to the radius area. Thus, the magnetic disk device 1 can improve the credibility of data.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
a disk;
a head including a first write head and a second write head configured to write data to the disk and a read head configured to read data from the disk; and
a controller configured to write write data to a first area of the disk with the first write head and to overwrite the write data written with the first write head in the first area with the second write head, wherein
the controller adjusts a first timing to overwrite the write data written with the first write head with the second write head based on a correction value.

2. The magnetic disk device of claim 1, wherein the controller calculates the correction value based on a first read waveform from reading of the write data written with the first write head and a second read waveform from reading the write data overwritten with the second write head.

3. The magnetic disk device of claim 1, wherein the controller calculates the correction value based on a gap between the first write head and the second write head and a rotation speed of the disk.

4. The magnetic disk device of claim 1, wherein the first write head is disposed between the read head and the second write head, and a first width of the first write head in the radius direction is less than a second width of the second write head in the radius direction.

5. The magnetic disk device of claim 4, wherein the controller performs, if the head is inclined to a first direction of the radius direction of the disk, shingled magnetic recording in the first direction.

6. The magnetic disk device of claim 1, wherein the first write head is disposed between the read head and the second write head, and a first width of the first write head in the radius direction is greater than a second width of the radius direction of the second write head.

7. The magnetic disk device of claim 6, wherein the controller performs, if the head is inclined to a first direction of the radius direction of the disk, shingled magnetic recording in a second direction which is opposite to the first direction of the radius direction.

8. The magnetic disk device of claim 1, wherein the controller writes the write data with the first write head using a write current of a second frequency which is less than a first frequency of a write current of the write data overwritten with the second write head.

9. The magnetic disk device of claim 1, wherein the controller further overwrites the write data overwritten with the second write head in the first area.

10. A write processing method applied to a magnetic disk device including a disk, a first write head and a second write head configured to write data to the disk, and a read head configured to read data from the disk, the method comprising:
writing write data in a first area of the disk with the first write head;
overwriting the write data written with the first write head in the first area with the second write head; and
adjusting a first timing to overwrite the write data written with the first write head with the second write head based on a correction value.

11. The write processing method of claim 10, further comprising:
calculating the correction value based on a first read waveform from reading of the write data written with the first write head and a second read waveform from reading the write data overwritten with the second write head.

12. The write processing method of claim 10, further comprising:
calculating the correction value based on a gap between the first write head and the second write head and a rotation speed of the disk.

13. The write processing method of claim 10, wherein the first write head is disposed between the read head and the second write head, and a first width of the radius direction of the first write head is less than a second width of the radius direction of the second write head.

14. The write processing method of claim 13, further comprising, if the head is inclined to a first direction of the radius direction of the disk, performing shingled magnetic recording in the first direction.

15. The write processing method of claim 10, wherein the first write head is disposed in the read head and the second write head, and a first width of the radius direction of the first write head is greater than a second width of the radius direction of the second write head.

16. The write processing method of claim 15, further comprising, if the head is inclined to a first direction of the radius direction of the disk, performing shingled magnetic recording in a second direction which is opposite to the first direction of the radius direction.

17. The write processing method of claim 10, further comprising:
   writing the write data with the first write head using a write current of a second frequency which is less than a first frequency of a write current of the write data overwritten with the second write head.

18. The written processing method of claim 10, further comprising:
   overwriting the write data overwritten with the second write head in the first area.

* * * * *